US009226513B2

(12) United States Patent
Ream et al.

(10) Patent No.: US 9,226,513 B2
(45) Date of Patent: Jan. 5, 2016

(54) NON-CONTACT PRINTED COMESTIBLE PRODUCTS AND APPARATUS AND METHOD FOR PRODUCING SAME

(75) Inventors: Ronald L. Ream, Plano, IL (US);
Enrique Valdez, Oak Lawn, IL (US);
William R. Gleffe, Lemont, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 942 days.

(21) Appl. No.: 11/692,746

(22) Filed: Mar. 28, 2007

(65) Prior Publication Data
US 2007/0231425 A1     Oct. 4, 2007

Related U.S. Application Data

(60) Provisional application No. 60/743,929, filed on Mar. 29, 2006, provisional application No. 60/889,646, filed on Feb. 13, 2007.

(51) Int. Cl.
*A23G 4/18*      (2006.01)
*A23G 3/28*      (2006.01)
(Continued)

(52) U.S. Cl.
CPC .............. *A23G 3/28* (2013.01); *A21D 13/0087* (2013.01); *A23G 3/0021* (2013.01); *A23G 3/0068* (2013.01); *A23G 3/0097* (2013.01); *A23G 3/0242* (2013.01); *A23G 3/0289* (2013.01);
(Continued)

(58) Field of Classification Search
CPC ... A23V 2250/6422; A23G 4/20; A23G 3/54; A23G 3/0097; A23G 3/343; B41J 3/407; B41J 3/4073; A23P 2001/089

USPC ............ 426/87, 307, 383, 3–6, 103, 512, 660
See application file for complete search history.

(56) References Cited

U.S. PATENT DOCUMENTS 810,210 A     1/1906  Laws
3,052,552 A   9/1962  Koerner et al.
(Continued)

FOREIGN PATENT DOCUMENTS

AU    2006201115 A1    3/2009
CH        662358 A5    9/1987
(Continued)

OTHER PUBLICATIONS

TechTerms: DPI (Dots Per Inch). Retrieved Apr. 12, 2010 from: http://www.techterms.com/definition/dpi.*
(Continued)

*Primary Examiner* — Drew Becker
*Assistant Examiner* — Luana Z Long
(74) *Attorney, Agent, or Firm* — Armstrong Teasdale LLP

(57) ABSTRACT

The present disclosure provides systems, apparatuses, methods and products directed to non-contact printing of confectionery products. The confectionery products may include an edible substrate having a surface and an edible ink printed on the edible surface. The edible ink may cover at least about 5% of the surface. An apparatus of the present disclosure may include a removal device for removing at least a portion of a rolling compound from a confectionery material and a printing device for non-contact printing an edible ink-indicia on the confectionery material. An apparatus of the present disclosure may also include a detection device detecting the presence of confectionery material at a predetermined position.

14 Claims, 11 Drawing Sheets

(51) Int. Cl.

| | | |
|---|---|---|
| *A21D 13/00* | (2006.01) | |
| *A23G 3/34* | (2006.01) | |
| *A23G 3/02* | (2006.01) | |
| *A23G 3/20* | (2006.01) | |
| *A23G 3/50* | (2006.01) | |
| *A23G 3/54* | (2006.01) | |
| *A23G 4/20* | (2006.01) | |
| *A23P 1/00* | (2006.01) | |
| *A23P 1/10* | (2006.01) | |
| *B05B 12/02* | (2006.01) | |
| *B05B 13/04* | (2006.01) | |
| *B05C 11/10* | (2006.01) | |
| *B41J 3/407* | (2006.01) | |
| *A23P 1/08* | (2006.01) | |
| *B05C 5/00* | (2006.01) | |

(52) U.S. Cl.
CPC ............ *A23G 3/2007* (2013.01); *A23G 3/2015* (2013.01); *A23G 3/2092* (2013.01); *A23G 3/50* (2013.01); *A23G 3/54* (2013.01); *A23G 4/18* (2013.01); *A23G 4/20* (2013.01); *A23P 1/00* (2013.01); *A23P 1/10* (2013.01); *B05B 12/02* (2013.01); *B05B 13/0447* (2013.01); *B05C 11/1002* (2013.01); *B41J 3/407* (2013.01); *A23P 2001/089* (2013.01); *B05C 5/004* (2013.01); *B05C 5/005* (2013.01)

(56) References Cited

U.S. PATENT DOCUMENTS

| | | |
|---|---|---|
| 3,570,417 A | 3/1971 | Herrmann et al. |
| 3,962,463 A * | 6/1976 | Witzel ................. 426/5 |
| 4,027,047 A | 5/1977 | Harima |
| 4,309,450 A | 1/1982 | Seibert |
| 4,322,449 A | 3/1982 | Voss et al. |
| 4,368,684 A | 1/1983 | Launay |
| 4,440,702 A | 4/1984 | Susnjara |
| RE31,764 E | 12/1984 | Voss et al. |
| 4,522,840 A | 6/1985 | Corfield et al. |
| 4,548,825 A | 10/1985 | Voss et al. |
| 4,578,273 A | 3/1986 | Krubert |
| 4,612,195 A | 9/1986 | Puglia |
| 4,672,892 A | 6/1987 | Ackley |
| 4,822,621 A * | 4/1989 | Glass et al. ................. 426/5 |
| 4,853,037 A | 8/1989 | Johnson et al. |
| 4,877,745 A | 10/1989 | Hayes et al. |
| 4,882,175 A | 11/1989 | Ream et al. |
| 4,905,589 A | 3/1990 | Ackley |
| 4,906,170 A | 3/1990 | Nelson et al. |
| 4,985,260 A | 1/1991 | Niaura et al. |
| 5,006,362 A | 4/1991 | Hilborn |
| 5,049,399 A | 9/1991 | Huang et al. |
| 5,091,004 A | 2/1992 | Tabayashi et al. |
| 5,112,399 A | 5/1992 | Slevin et al. |
| 5,125,969 A | 6/1992 | Nishiwaki et al. |
| 5,156,675 A | 10/1992 | Breton et al. |
| 5,221,332 A | 6/1993 | Kohlmeier |
| 5,281,261 A | 1/1994 | Lin |
| 5,316,575 A | 5/1994 | Lent et al. |
| 5,376,388 A | 12/1994 | Meyers |
| 5,397,387 A | 3/1995 | Deng et al. |
| 5,409,715 A | 4/1995 | Meyers |
| 5,423,252 A | 6/1995 | Yamamoto et al. |
| 5,431,720 A | 7/1995 | Nagai et al. |
| 5,431,722 A | 7/1995 | Yamashita et al. |
| 5,433,146 A | 7/1995 | Ackley |
| 5,433,960 A | 7/1995 | Meyers |
| 5,435,840 A | 7/1995 | Hilborn |
| 5,439,514 A | 8/1995 | Kashiwazaki et al. |
| 5,443,628 A | 8/1995 | Loria et al. |
| 5,453,122 A | 9/1995 | Lyon et al. |
| 5,455,606 A | 10/1995 | Keeling et al. |
| 5,462,590 A | 10/1995 | Yui et al. |
| 5,466,287 A | 11/1995 | Lyon |
| 5,481,288 A | 1/1996 | Keeling et al. |
| 5,505,775 A | 4/1996 | Kitos |
| 5,514,209 A | 5/1996 | Larson, Jr. |
| 5,522,922 A | 6/1996 | Furusawa et al. |
| 5,529,767 A | 6/1996 | Brox et al. |
| 5,531,818 A | 7/1996 | Lin et al. |
| 5,534,281 A | 7/1996 | Pappas et al. |
| 5,538,742 A * | 7/1996 | McHale et al. ................. 426/5 |
| 5,580,372 A | 12/1996 | Gino et al. |
| 5,601,639 A | 2/1997 | Myers et al. |
| 5,609,908 A | 3/1997 | Voss |
| 5,624,485 A | 4/1997 | Calhoun |
| 5,637,139 A | 6/1997 | Morelos et al. |
| 5,655,453 A | 8/1997 | Ackley |
| 5,667,569 A | 9/1997 | Fujioka |
| 5,681,380 A | 10/1997 | Nohr et al. |
| 5,700,313 A | 12/1997 | Larson |
| 5,705,247 A | 1/1998 | Arai et al. |
| 5,768,996 A | 6/1998 | Ackley |
| 5,800,601 A | 9/1998 | Zou et al. |
| 5,836,243 A | 11/1998 | Ackley |
| 5,888,287 A | 3/1999 | Brown et al. |
| 5,891,228 A | 4/1999 | Baker et al. |
| 5,897,694 A | 4/1999 | Woolf |
| 5,935,310 A | 8/1999 | Engel et al. |
| 5,938,826 A | 8/1999 | Baker et al. |
| 5,961,703 A | 10/1999 | Fraas |
| 5,972,085 A | 10/1999 | Simpson |
| 5,972,392 A * | 10/1999 | Kopecky et al. ................. 426/5 |
| 6,020,397 A | 2/2000 | Matzinger |
| 6,058,843 A | 5/2000 | Young |
| 6,093,239 A | 7/2000 | Baker et al. |
| 6,113,678 A | 9/2000 | Malhotra |
| 6,123,848 A | 9/2000 | Quepons Dominguez et al. |
| 6,200,510 B1 | 3/2001 | Ducharme, Jr. et al. |
| 6,230,073 B1 | 5/2001 | Kofman et al. |
| 6,231,654 B1 | 5/2001 | Elwakil |
| 6,267,997 B1 * | 7/2001 | Ream et al. ................. 426/3 |
| 6,274,162 B1 | 8/2001 | Steffenino et al. |
| 6,286,421 B1 | 9/2001 | Ackley |
| 6,309,200 B1 | 10/2001 | Teutsch |
| 6,314,876 B1 | 11/2001 | Ackley |
| 6,450,615 B2 | 9/2002 | Kojima et al. |
| 6,481,347 B2 | 11/2002 | Ackley |
| 6,499,842 B1 | 12/2002 | Kofman et al. |
| 6,540,821 B2 | 4/2003 | Adamic et al. |
| 6,576,347 B1 | 6/2003 | Gomez |
| 6,623,553 B2 | 9/2003 | Russell et al. |
| 6,623,785 B2 | 9/2003 | Childers |
| 6,648,951 B2 | 11/2003 | Chen et al. |
| 6,660,318 B2 | 12/2003 | Yoon et al. |
| 6,702,884 B2 | 3/2004 | Brown |
| 6,702,894 B2 | 3/2004 | Lee et al. |
| 6,747,072 B1 | 6/2004 | Siddiqui |
| 6,783,768 B1 | 8/2004 | Brown et al. |
| 6,823,795 B2 | 11/2004 | Willcocks et al. |
| 6,878,390 B2 * | 4/2005 | Murray et al. ................. 426/76 |
| 6,893,671 B2 | 5/2005 | Ben-Yoseph et al. |
| 6,902,246 B2 | 6/2005 | Varnon et al. |
| 6,962,715 B2 | 11/2005 | Lee et al. |
| 7,029,112 B2 | 4/2006 | Shastry et al. |
| 7,114,445 B2 | 10/2006 | Ackley et al. |
| D539,007 S | 3/2007 | Clark et al. |
| 7,186,429 B2 | 3/2007 | Finkowski et al. |
| 2001/0038871 A1 | 11/2001 | Nardi |
| 2001/0046535 A1 | 11/2001 | Bowling |
| 2002/0008751 A1 | 1/2002 | Spurgeon et al. |
| 2002/0034475 A1 | 3/2002 | Ribi |
| 2002/0114863 A1 | 8/2002 | Ream et al. |
| 2002/0114878 A1 | 8/2002 | Ben-Yoseph et al. |
| 2002/0135651 A1 | 9/2002 | Spurgeon et al. |
| 2002/0152927 A1 * | 10/2002 | Russell et al. ............. 106/31.13 |
| 2002/0197388 A1 | 12/2002 | Brown et al. |
| 2003/0026873 A1 * | 2/2003 | Collins et al. ................. 426/87 |
| 2003/0035870 A1 | 2/2003 | Ackley, Jr. et al. |
| 2003/0097949 A1 | 5/2003 | Candler et al. |
| 2003/0101902 A1 | 6/2003 | Reitnauer et al. |

(56) References Cited

U.S. PATENT DOCUMENTS

| | | |
|---|---|---|
| 2003/0156541 A1 | 8/2003 | Haihong |
| 2003/0224090 A1* | 12/2003 | Pearce et al. ............. 426/89 |
| 2004/0013778 A1 | 1/2004 | Ackley, Jr. et al. |
| 2004/0021757 A1 | 2/2004 | Shastry et al. |
| 2004/0050289 A1 | 3/2004 | Russell et al. |
| 2004/0086603 A1 | 5/2004 | Shastry et al. |
| 2004/0091594 A1 | 5/2004 | Ackley, Jr. et al. |
| 2004/0120991 A1 | 6/2004 | Gardner et al. |
| 2004/0137140 A1 | 7/2004 | Childers |
| 2004/0154534 A1 | 8/2004 | Lee et al. |
| 2004/0173146 A1 | 9/2004 | Figueroa et al. |
| 2004/0173147 A1 | 9/2004 | Figueroa et al. |
| 2004/0175331 A1 | 9/2004 | Figueroa et al. |
| 2004/0175463 A1 | 9/2004 | Shastry et al. |
| 2004/0219109 A1 | 11/2004 | Hatch |
| 2005/0003055 A1 | 1/2005 | Baydo et al. |
| 2005/0003056 A1 | 1/2005 | Romanach et al. |
| 2005/0003074 A1 | 1/2005 | Brown et al. |
| 2005/0061184 A1 | 3/2005 | Russell et al. |
| 2005/0069612 A1 | 3/2005 | Wen et al. |
| 2005/0129746 A1 | 6/2005 | Lee et al. |
| 2005/0155545 A1 | 7/2005 | Booth et al. |
| 2005/0157148 A1 | 7/2005 | Baker et al. |
| 2005/0163898 A1 | 7/2005 | Romanach et al. |
| 2005/0186253 A1 | 8/2005 | Lee et al. |
| 2005/0220934 A1* | 10/2005 | Leadbeater et al. ............. 426/3 |
| 2005/0226975 A1 | 10/2005 | Drouillard |
| 2005/0232973 A1 | 10/2005 | Gore |
| 2005/0232974 A1 | 10/2005 | Gore |
| 2005/0255205 A1 | 11/2005 | Baydo et al. |
| 2006/0034984 A1 | 2/2006 | Baydo et al. |
| 2006/0110551 A1 | 5/2006 | Shastry et al. |
| 2006/0228451 A1* | 10/2006 | Martin ............. 426/383 |
| 2006/0251776 A1 | 11/2006 | Baker |
| 2006/0275528 A1 | 12/2006 | Collins et al. |
| 2007/0048407 A1 | 3/2007 | Collins et al. |
| 2007/0062404 A1 | 3/2007 | Ackley, Jr. et al. |
| 2007/0071851 A1 | 3/2007 | Baker et al. |
| 2007/0231434 A1 | 10/2007 | Ream et al. |
| 2007/0231435 A1 | 10/2007 | Ream et al. |

FOREIGN PATENT DOCUMENTS

| | | |
|---|---|---|
| EP | 0475075 A1 | 3/1992 |
| EP | 0705890 A1 | 4/1996 |
| GB | 2277094 A | 10/1994 |
| JP | 58-052375 A | 3/1983 |
| JP | 59-230071 A | 12/1984 |
| JP | 2006-180881 A | 7/2006 |
| WF | 2004080193 A1 | 9/2004 |
| WO | 9214795 A1 | 9/1992 |
| WO | 9527758 A1 | 10/1995 |
| WO | 9717409 A1 | 5/1997 |
| WO | 9735933 A1 | 10/1997 |
| WO | 9829514 A1 | 7/1998 |
| WO | 9967334 A1 | 12/1999 |
| WO | 0194116 A2 | 12/2001 |
| WO | 2007005063 A1 | 1/2007 |

OTHER PUBLICATIONS

Princeton University "About WordNet." WordNet. Princeton University. 2010. <http://wordnet.princeton.edu>.*

Definition of "Imprint" from Dictionary.com (available at http://dictionary.reference.com/browse/imprint).

* cited by examiner

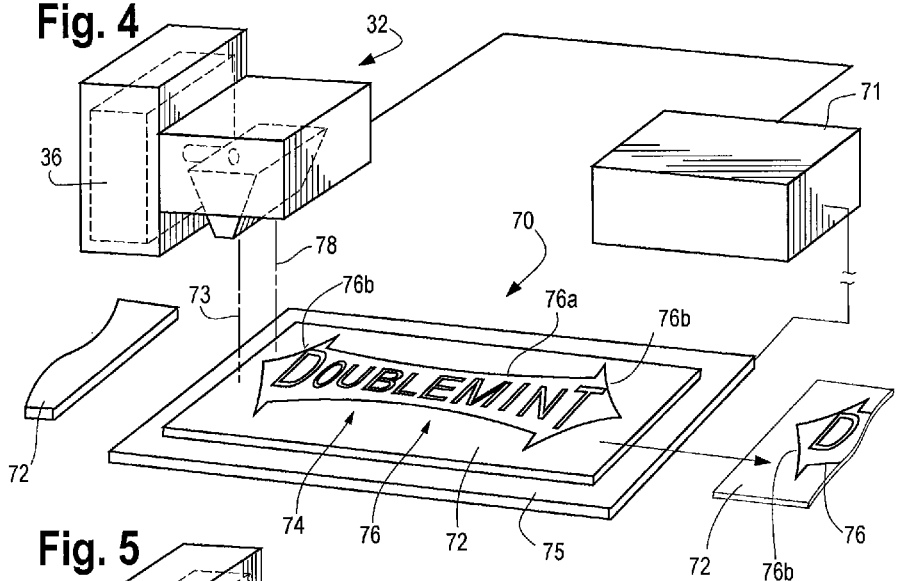
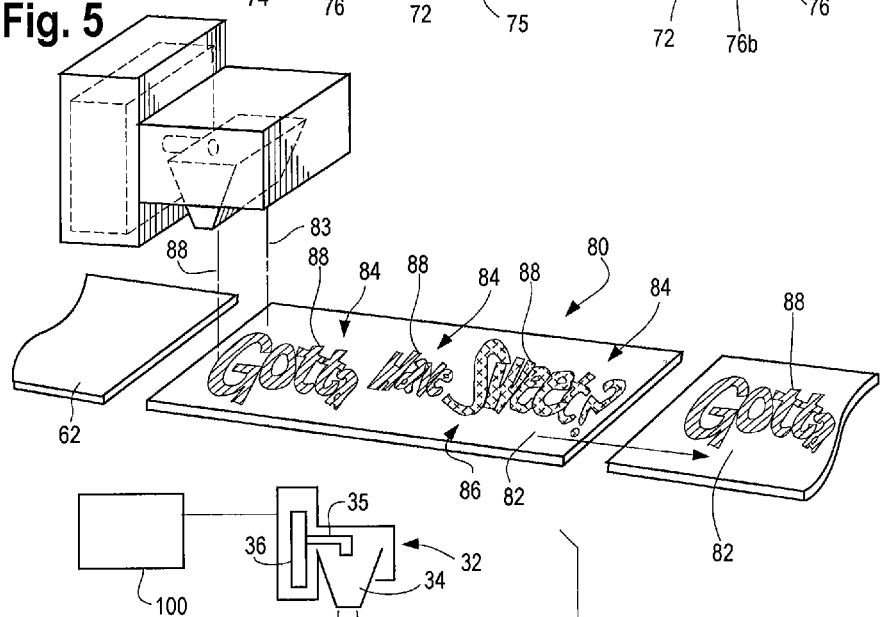
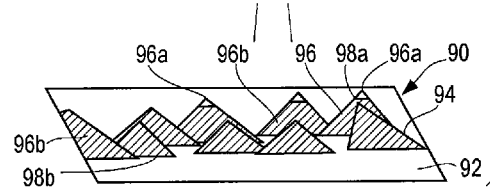

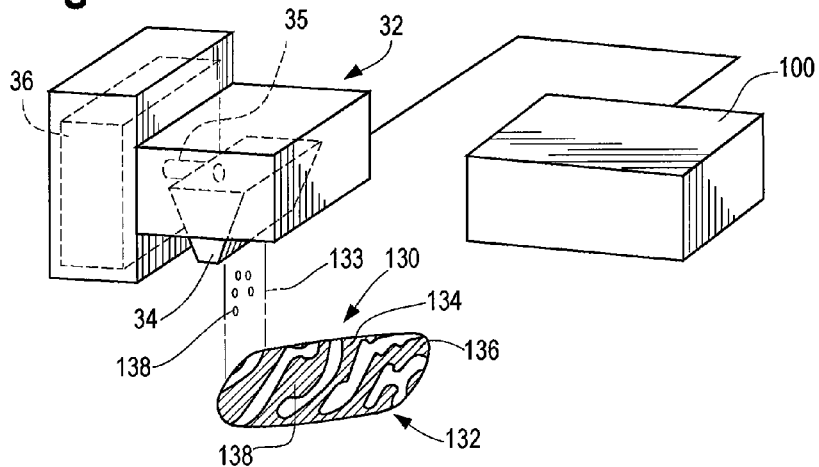
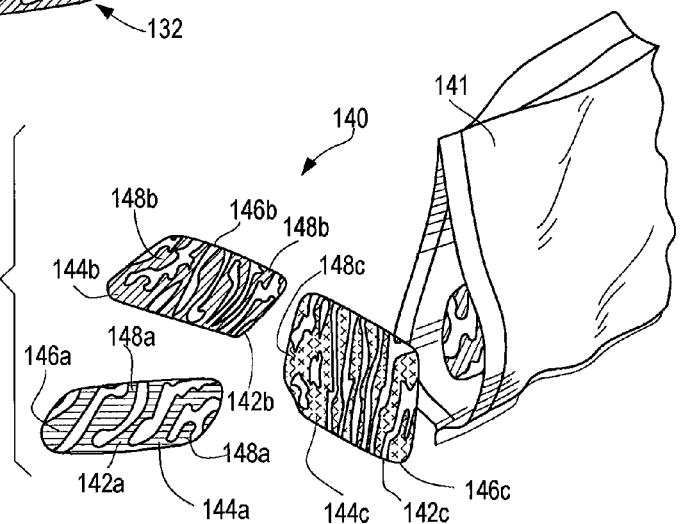
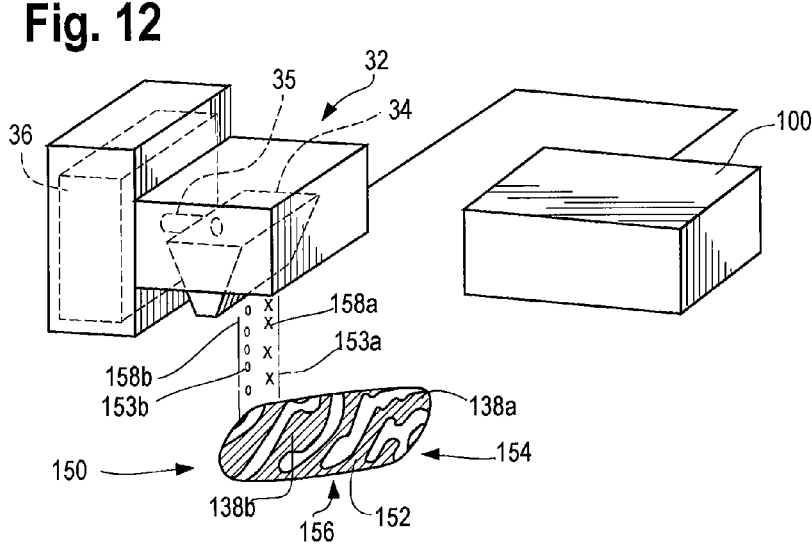

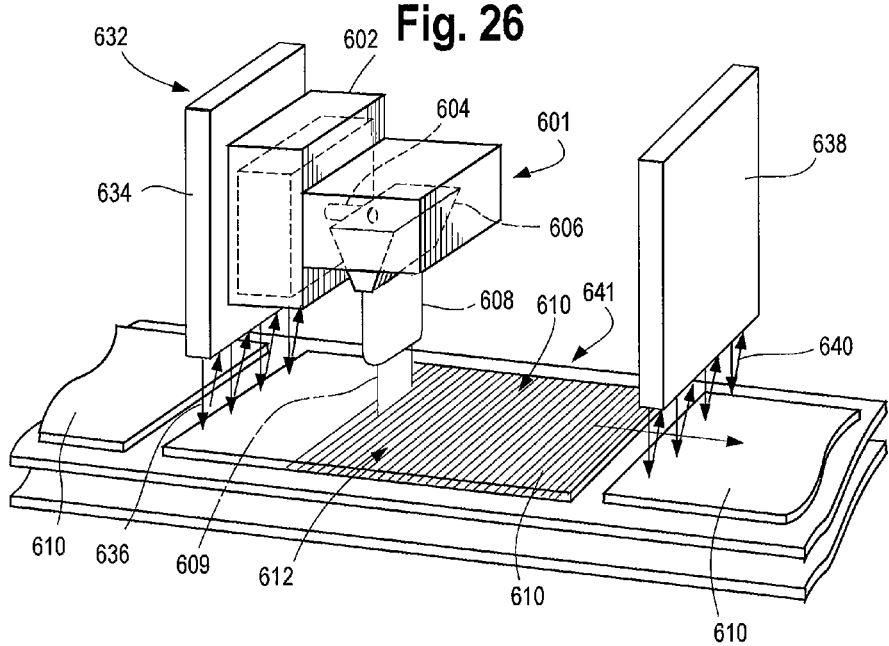
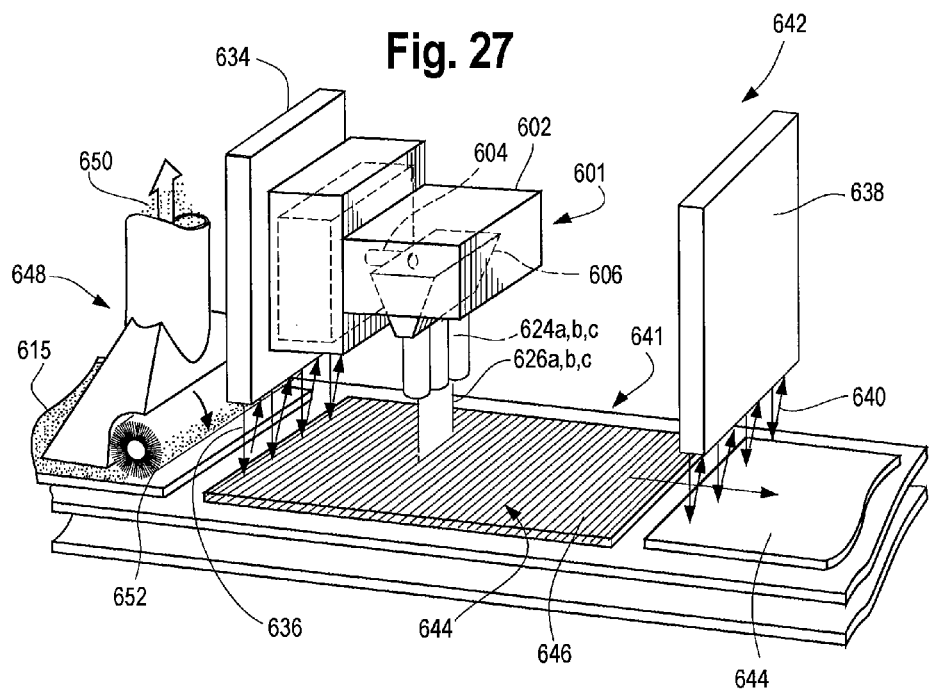

NON-CONTACT PRINTED COMESTIBLE PRODUCTS AND APPARATUS AND METHOD FOR PRODUCING SAME

PRIORITY CLAIM

This Application claims the benefit of U.S. Provisional Application Ser. No. 60/743,929 filed on Mar. 29, 2006 and U.S. Provisional Application Ser. No. 60/889,646 filed on Feb. 13, 2007, the entire content of each Application being incorporated by reference herein.

BACKGROUND

The present disclosure relates generally to confectionery products. More specifically, the present disclosure relates to non-contact printed confectionery products and methods for producing same.

There are numerous types of confectionery products or compositions having an edible ink printed thereon. Such confectionery products can include, for instance, chewing gum or candy. It is generally known to print edible inks onto confectionery products and that confectionery products having visually pleasing appearances can lead to enhanced marketability with consumers.

SUMMARY

The present disclosure provides confectionery products and methods of producing confectionery products with improved consumer appeal. In particular, non-contact printing of edible ink onto edible substrates is utilized to create multi-sensory enhancements to confectionery products. The confectionery products of the present disclosure provide a visually attractive product that brings added excitement and enjoyment to product consumption.

In an embodiment, a confectionery product is provided. The confectionery product includes an edible substrate having a surface and an edible ink printed on the edible substrate. The edible ink may cover at least about 5% of the surface. Alternatively, the edible ink may cover at least about 50% of the surface. Further, the edible ink may cover at least about 75% of the surface. Similarly, the edible ink may cover about 100% of the surface. The edible ink may be multicolored. Further, only a single color of edible ink may be present on any portion of the surface of the edible substrate. The edible ink may be an inkjet ink.

In an embodiment, the edible substrate may be a chewing gum stick, a chewing gum tablet, a chewing gum pellet, a coated chewing gum, a center-filled chewing gum, or combinations thereof. Further, the edible substrate may include chewing gum trim. The edible ink may mask any inconsistencies due to the presence of trim in the edible substrate.

In another embodiment, the edible substrate has a first surface and an opposing second surface and the edible ink is printed on only the first surface. The edible ink may cover at least about 5% of the first surface of the edible substrate. Similarly, the edible ink may be printed on each of a first and a second surface of the edible substrate. The edible ink may cover at least about 5% of each of the first and the second surfaces of the edible substrate. Alternatively, the edible ink may cover at least about 50% of the first and the second surfaces of the edible substrate. Further, the edible ink may cover at least about 75% of the first and the second surfaces of the edible substrate. Similarly, the edible ink may cover about 100% of the first and second surfaces of the edible substrate.

In an embodiment, a confectionery product is provided. The confectionery product includes an edible substrate having a body and first and second surfaces that are located on opposite sides of the edible substrate. The product further includes an edible ink printed on the edible substrate where the edible ink covers at least about 5% of the first surface and does not extend through the body, and therefore is not visible on the second surface of the edible substrate. Alternatively, the edible ink may cover at least about 50% of the first surface and not extend through the body. Further, the edible ink may cover at least about 75% of the first surface and not extend through the body.

In an embodiment, the edible ink may cover about 100% of the first and/or second surface of the edible substrate. Covering the entirety of one or both surfaces of the edible substrate gives the confectionery product the appearance of a co-extruded product. Covering all of one or both surfaces also permits trim material to be incorporated into the edible substrate as the edible ink may cover or mask any inconsistencies of the trim material. Further, in an embodiment, the trim material may produce an edible substrate with a first color. The color of the edible ink may be selected to be the same color as the edible substrate, the ink having a greater color concentration than the edible substrate. For example, the trim-containing edible substrate may be a light shade of red (or a pink) and the edible ink applied to the edible substrate may be a dark red color.

In another embodiment, the edible ink is printed on the second surface of the edible substrate. The edible ink may be an inkjet ink. The edible ink may be printed on the edible substrate at a dot concentration from about 3600 dots per square inch to about 36,400 dots per square inch.

In an embodiment, the edible substrate may be a chewing gum stick, a chewing gum tablet, a chewing gum pellet, a coated chewing gum, a center-filled chewing gum or combinations thereof. Further, the edible substrate may include trim material that is recycled back into a bulk mixer during manufacturing of the gum.

In still yet another embodiment, a method for producing a confectionery product is provided. The method includes non-contact printing an edible ink onto a surface of an edible substrate to cover at least about 5% of the surface. The method may include covering at least about 50% of the surface with edible ink. The method may further include covering at least about 75% of the surface with the edible ink. The method may further include covering at least about 100% of the surface with the edible ink. The edible ink may be an inkjet ink.

In an embodiment, the method includes non-contact printing a multiple color edible ink.

In an embodiment, the method includes applying the edible ink at a dot concentration from about 3600 dots per square inch to about 36,400 dots per square inch. The method may also include the edible substrate traversing a printing device at least once.

In an embodiment, the method includes allowing the edible ink to absorb partially through a body of the edible substrate to provide the edible substrate with a co-extruded appearance.

In another embodiment, an apparatus is provided. The apparatus includes a removal device for removing at least a portion of a rolling compound from a confectionery material and a printing device for non-contact printing an edible ink-indicia on the confectionery material.

In an embodiment, the apparatus may further include a transport device for moving the confectionery material under the printing device.

In an embodiment, the printing device may be a spray device. Alternatively, the printing device may be an ink jet printing device.

In an embodiment, the removal device may be a vacuum system, a brush device, a sponge device, and combinations thereof.

In an embodiment, the apparatus may further include a detection device in operative communication with the printing device. In this embodiment, the printing device non-contact prints the edible ink-indicia on the confectionery material after the detection device detects the confectionery material at a predetermined position. The detection device may include at least one photoeye.

In an embodiment, the confectionery material may be a chewing gum stick, a chewing gum tablet, a chewing gum pellet, a coated chewing gum, a center-filled chewing gum, and combinations thereof.

In another embodiment, an apparatus is provided. The apparatus includes a transport device for moving a confectionery material to a predetermined position, a detection device detecting the presence of the confectionery material at the predetermined position, and a printing device in operative communication with the detection device. In this embodiment, the printing device non-contact prints an edible ink-indicia on the confectionery material after the detection device detects the confectionery material at the predetermined position.

In an embodiment, the apparatus may further include a removal device for removing at least a portion of a rolling compound from the confectionery material.

In another embodiment, a method is provided for producing a confectionery product. The method includes removing a rolling compound from a confectionery material and non-contact printing an edible ink-indicia on the confectionery material. The method may include removing from about 80% to about 99% of the rolling compound from the confectionery material.

In an embodiment, the removing is an act such as, for example, vacuuming the rolling compound from the confectionery material, brushing the rolling compound from the confectionery material, sponging the rolling compound from the confectionery material, and combinations thereof.

In an embodiment, the method may further include non-contact printing the edible ink-indicia on the confectionery material when the ink-indicia is at the predetermined position.

In another embodiment, a method is provided for producing a confectionery product. The method includes moving a confectionery material to a predetermined position, detecting the presence of the confectionery material at the predetermined position and non-contact printing an edible ink-indicia on the confectionery material.

In an embodiment, the method includes removing a rolling compound from the confectionery material before the non-contact printing.

In an embodiment, a method for producing a chewing gum product is provided. The method includes providing a consumer with the ability to select an organoleptic component and producing a chewing gum product with the organoleptic component after the consumer selection. The method further includes delivering the chewing gum product to the consumer. An Internet site may be provided to the consumer with a list of organoleptic components. The chewing gum product may be delivered to the consumer by way of mail or similar courier system.

In an embodiment, the method includes dispensing the organoleptic component on a surface of the chewing gum product.

In an embodiment, the method includes providing the consumer the ability select to an indicia, and producing the chewing gum with the indicia. The indicia may be printed with edible ink on a surface of the chewing gum product.

In an embodiment, the method may include generating a list of organoleptic components in a computer-readable medium, receiving data that selects at least one of the organoleptic components, generating instruction data from the received data; and transmitting the instruction data to a dispensing device. The dispensing device may then dispense the organoleptic component onto a surface of an edible substrate based on the instruction data.

In an embodiment, the received data may include indicia data, and the instruction data may include indicia data printing instructions. The method may further include transmitting the indicia data printing instructions to a printing device. The printing device may then print an edible ink-indicia on the surface of the edible substrate based on the indicia data printing instructions.

In an embodiment, a method of generating revenue is provided. The method includes allowing a consumer to create a custom chewing gum by selecting an organoleptic component, and producing a chewing gum product with the selected organoleptic component. The method may further include allowing the consumer to select an indicia and producing the chewing gum product with the indicia. The method may also include paying a fee by the consumer, the fee based on the number of organoleptic components, the number indicia, the number of chewing gum products desired, and combinations thereof.

An advantage of the present disclosure is to provide an improved method for making chewing gum.

Another advantage of the present disclosure is to provide an improved chewing gum.

An advantage of the present disclosure is to provide confectionery products printed with edible ink where the edible ink does not bleed-through the product.

Another advantage of the present disclosure is to provide aesthetically appealing confectionery products.

Another advantage of the present disclosure is to provide confectionery products that appear multi-layered or co-extruded.

Another advantage of the present disclosure is to provide a confectionery product including trim material in the edible substrate.

A further advantage of the present disclosure is to provide a substantially flat stick of chewing gum having edible ink printed thereon.

Another advantage of the present disclosure is to provide an apparatus for non-contact printing an edible ink with improved adherence on confectionery products.

Another advantage of the present disclosure is to provide an improved method and apparatus for detecting defects in confectionery products.

A further advantage of the present disclosure is to provide high quality edible ink-indicia by removing rolling compound from confectionery material prior to non-contact printing the edible ink-indicia.

An advantage of the present disclosure is a method for producing a customized chewing gum product.

Additional features and advantages are described herein, and will be apparent from, the following Detailed Description and the figures.

BRIEF DESCRIPTION OF THE FIGURES

FIG. 4 is a perspective view of a printing device printing on an edible substrate of the present disclosure.

FIG. 5 is a perspective view of a printing device printing on an edible substrate of the present disclosure.

FIG. 6 is a perspective view of a printing device printing on an edible substrate of the present disclosure.

FIG. 10 is a perspective view of a printing device printing on an edible substrate of the present disclosure.

FIG. 11 is a perspective view of an edible product and a packaging of the present disclosure.

FIG. 12 is a perspective view of a printing device printing and an edible substrate of the present disclosure.

FIG. 26 is a perspective view of an apparatus for printing an edible ink on a confectionery product of the present disclosure.

FIG. 27 is a perspective view of an apparatus for printing an edible ink on a confectionery product of the present disclosure.

DETAILED DESCRIPTION

Figure 1:
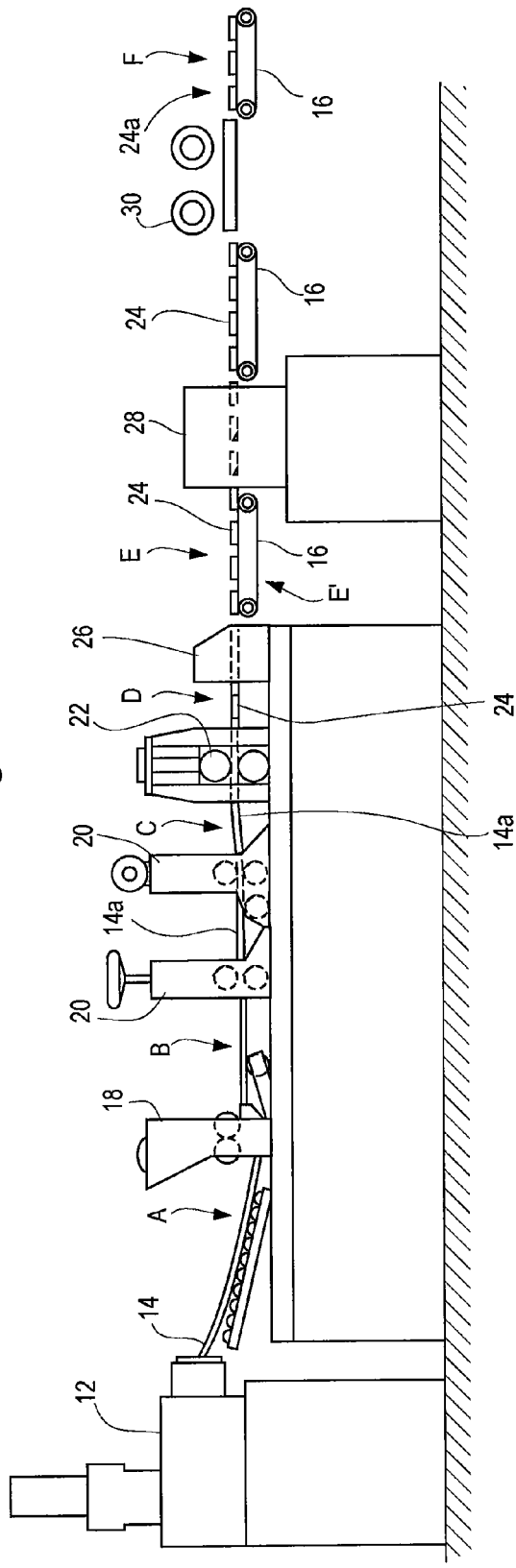
FIG. 1 is a schematic representation of an apparatus of the present disclosure.

Referring to the Figures, generally, and in particular to FIG. 1, a schematic view of apparatus 10 for producing a printed comestible is shown. Apparatus 10 may be a system for the continuous production of an edible product. Extruder 12 extrudes a continuous slab 14 of an edible substrate onto a conveyor 16. Slab 14 may be any continuous mass of an edible material for conveyance in the manufacturing process. Consequently, the continuous slab may have any nonlimiting shape or geometric form such as a rope, a sheet, a strand with any desired thickness as is commonly known in the art. It is understood that an "edible" product or "edible" substrate is a composition that is suitable for consumption and is non-toxic. An edible material may also be a material that complies with applicable standards such as food, drug, cosmetic (FD&C) regulations in the United States and/or Eurocontrol experimental center (E.E.C.) standards in the European Union. Nonlimiting examples of suitable edible substrates include confectionery materials, pasta, extruded snacks such as crackers and snack chips, marshmallows, pastries, pet food, cereals, sausage, and cheese.

In an embodiment, the edible substrate may be a confectionery material. The confectionery material may be any hard candy, soft candy, chewing gum, or other confectionery substance, or compound that has a fluid phase or may take a flowable form. In other words, the confectionery material may be any material that may be heated, melted, dissolved melted, form a syrup, or be dissolved in a liquid to become flowable as is commonly known in the art. The skilled artisan will appreciate that the moisture content (and concomitant viscosity) of the confectionery material may vary greatly. The moisture content of the flowable phase of the confectionery substrate may typically be in the range of about 0.5% to about 20% by weight of the confectionery material. The flowable confectionery material may be subsequently cooled or solidified at room temperature to form a solid or semi-solid confectionery. Nonlimiting examples of suitable confectionery materials that are flowable or may be placed into a flowable state include syrups, liquids or solids for making hard candies, soft candies, lollipops, fondants, toffees, jellies, chewing gums, chocolates, gelatins and nougats, fruit leather, and combinations thereof. The confectionery material may include sugar or may be sugar-free. Coloring may be added to the confectionery substrate as desired. The confectionery material may also include a pharmaceutical product or a medicament.

The edible substrate may be any edible comestible, material, or substrate as previously discussed herein. The edible substrate may also have planar surfaces, non-planar surfaces, or a combination of planar and non-planar surfaces. Further, the edible substrate may have a flat, a curved, a wavy, a convex (i.e., pellet, tablet, or bean-shaped), or a concave surface contour, and may be coated or uncoated.

In an embodiment, the edible substrate may be a flat stick, or a substantially flat stick of chewing gum, a chewing gum tablet, a chewing gum pellet, a coated chewing gum, a center-filled chewing gum, or combinations thereof. The edible substrate may also include chewing gum trim that is recycled back into a bulk mixer during manufacturing of the gum. One of ordinary skill in the art will appreciate that trim material, such as trim chewing gum material, is material that has been used in a previous final confectionery product or a batch or a run for producing a final confectionery product. Trim material may include rework confectionery, scrap confectionery, or a blend of two or more virgin or starting confectionery materials that have come into contact with each other during a previous confectionery production process.

In an embodiment, slab 14 may be a center-filled extrudate. Nonlimiting examples of suitable center fill materials include any liquid, syrup, paste, colloid, or solid edible material. In an embodiment, slab 14 may be a confectionery material with a fill material such as boiled candy, hard candy, soft candy, toffee, jelly, syrup, paste, chewing gum, bubble gum, chocolate, gelatin, caramel, taffy, nougat, granular candy, and combinations thereof.

Depending on the composition of the confectionery material, apparatus 10 may or may not include a dusting device 18. For example, apparatus 10 may not include a dusting device when slab 14 is a soft candy. In an embodiment, apparatus 10 may include dusting device 18 when slab 14 is a chewing gum material. Dusting device 18 may disperse a dusting compound (such as talc or starch) upon slab 14 to reduce adhesiveness between the slab and apparatus components. In a further embodiment, a minimal amount of dusting compound may be applied to slab 14 in order to improve print quality.

Rollers 20 may be used to size or otherwise thin slab 14 to any dimension as desired. In an embodiment, rollers 20 may size slab 14 into a flat or substantially flat sheet of confectionery material. In a further embodiment, the sheet may have a thickness from about 0.058 inches to about 0.062 inches, or about 0.060 inches. In yet a further embodiment, slab 14 may be extruded chewing gum in the form of a thick slab which may be reduced to a sheet of any desired thickness by way of one or more calander rolls. Once the desired thickness is achieved, the slab may be printed, scored, and/or cut into final product dimensions. Alternatively, slab 14 may be sized to form pellet-shaped confectionery pieces.

After rollers 20 size slab 14 to the desired thickness, the rolled confectionery material may be cut and/or scored by cutting device 22. Cutting device 22 may form individual confectionery pieces directly from the slabbed confectionery material 14a. Alternatively, cutting device 22 (such as a scoring device) may cut large sheets of confectionery material which may be subsequently scored to form individual confectionery pieces 24. Pieces 24 may proceed to a cooling device 26 and onto further processing such as to a curing chamber 28, and optionally a coating device 30 whereupon coated confectionery pieces 24a are formed. Uncoated or coated individual confectionery pieces 24, 24a may proceed to a packaging machine as is commonly known in the art.

Figure 1A:
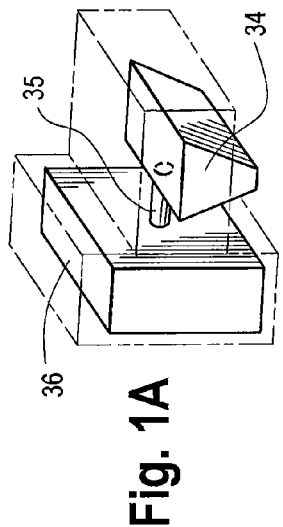
FIG. 1A is a perspective view of a printing device of the present disclosure.

As shown in FIG. 1A, apparatus 10 further includes a printing device 32 for printing an ink composition onto either the continuous slab 14, continuous supply of individual confectionery pieces 24, or coated confectionery pieces 24a. In an embodiment, printing device 32 may be any non-contact printing device as is commonly known in the art. As used herein, "non-contact printing" is the application of an ink composition to a substrate without the printing device touching a surface of the substrate to which the ink is applied. A non-contact printing device applies or dispenses an ink composition directly to the substrate without any intermediate structures between the printing device and the substrate. Non-contact printing may include spraying, dispensing, or otherwise applying an ink composition to one or more surfaces of the substrate. Thus, no part of the non-contact printing device touches the surface of the edible substrate such as slab 14 and/or pieces 24, 24a.

In a further embodiment, printing device 32 may be an ink jet printing device. Ink jet printers typically entail a print head in fluid communication with one or more ink reservoirs, the print head adapted for ink-jettable printing. In ink jet printing, the print head ejects or otherwise "jets" fine droplets of ink from the reservoir onto a receiving substrate. It is understood that printing device 32 may be configured to dispense or jet ink compositions or other fluids therefrom. Indeed, any jettable fluid may be dispensed from printing device 32. A "jettable" fluid or material may be any material (solid or liquid) that has properties sufficient to allow the material to be selectively deposited by an ink jet material dispenser as is commonly known in the art. Ink jet printing is advantageous, particularly with respect to comestibles as it provides 1) high resolution printing and 2) non-contact with the comestible thereby avoiding the risk of damage to the comestible item. Non-limiting examples of suitable non-contact printing devices include ink jet printing systems such as thermally actuated ink jet dispensers, mechanically actuated ink jet dispensers, electrostatically actuated ink jet dispensers, magnetically actuated ink jet dispensers, continuous ink jet printers, drop-on-demand (also called "impulse") ink jet printers, and acoustic ink jet systems.

In continuous inkjet systems, ink is emitted in a continuous stream under pressure through at least one nozzle. The stream is broken up into droplets by applying vibration or pressure pulses to the ink. This can be achieved by vibrating the nozzle or the nozzle assembly by means of a piezoelectric crystal, or by immersing a vibration probe, for example a piezoelectric crystal rod, in the ink itself. Typically, the ink droplets in continuous ink-jet systems are formed by a piezoelectric crystal, which is vibrated at controlled frequency adjacent to the ink stream. To control the flow of ink droplets, the ink is charged by applying a voltage between the ink jet before it breaks up into droplets and a charge electrode, so that each droplet carries a known charge. The charged droplets then pass through a deflection electric field where they are deflected from their straight line of flight by the deflection field applied. The extent of deflection will determine the point at which the droplets strike a substrate passing the printer and the charge and/or deflection fields are varied to direct the droplets to the desired location on the substrate. Droplets which are not to be printed are not deflected but are caught in a catcher or gutter and are returned to the ink reservoir for re-use.

Drop-on-demand jet systems, include piezojet and bubblejet (sometimes referred to as thermal ink-jet) systems. In bubblejet systems, a bubble is formed by a resistance heater in an ink reservoir. The resulting pressure wave from the bubble forces ink through the orifice plate, and as the heat is removed, the bubble begins to collapse and a droplet is ejected. Alternatively, the drop-on-demand system may form discrete droplets of ink which are ejected from an array of nozzles past which the substrate passes, the nozzles being activated at the desired frequency and in the desired order to form the desired image on the substrate. Thus, the printer may be one in which ink under pressure flows to the nozzles via valving means which are actuated under the control of a computer or the like to allow ink to flow to the required nozzle to eject a droplet from that nozzle.

In acoustic ink jet printing, one or more acoustic beams emanating from one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require small nozzles or small ejection orifices. The size of the ejection orifice is an important design parameter of an ink jet because it determines the size of the droplets of ink that the jet ejects. Acoustic printing has increased intrinsic reliability because there are no nozzles to clog. As will be appreciated, the elimination of the clogged nozzle failure mode is especially relevant to the reliability of large arrays of ink ejectors, such as arrays comprising several thousand separate ejectors. Furthermore, small ejection orifices are avoided, so acoustic printing can be performed with a large variety of inks, including inks having higher viscosities and inks containing pigments and other particulate components.

Printing device 32 may include one or more jetting heads 34 in fluid communication with one or more or more reservoirs 36 by way of channel 35 as shown in FIG. 1A. In an embodiment, reservoirs 36 may contain ink components so that printing device may deliver an ink or ink composition to the continuous slab, the individual pieces, or the coated pieces. In an embodiment, printing device 32 may be configured with four reservoirs, each reservoir containing edible ink compositions in typical colors such as cyan, magenta, yellow, and black or white in order to provide multiple color images. Printing device 32 may be configured with more or less reservoirs for more or less colors as desired. Each jetting head 34 may include one or more nozzles as is commonly known in the art. For example jetting head 34 may include from 1 to 10, 50, 100, 500, 1000, or 5,000 or more individual nozzles or jets. Each jetting head 34 may be in fluid communication with one or more fluid reservoirs 36. Jetting heads 34 may be arranged in any desired manner to deliver an ink composition onto continuous slab 14, 14a, pieces 24 and/or coated pieces 24a. For example, jetting heads 34 may be arranged in a single line. Alternatively, jetting heads 34 may be arranged in a series of lines to form a matrix-type printing profile.

The ink composition may be any water-based ink, solvent-based ink, wax-based ink, absorbing ink, pigment-containing, or non-pigment containing edible ink as is commonly known in the art. A water-based ink may be considered an ink that contains more water than non-aqueous solvent. Water-based inks typically include water, a pigment, a dispersant (such as a polyol) for the pigment, and may contain one or more non-aqueous solvents (such as one or more alcohols) and a dye. In an embodiment, the ink composition may be a water-based pigmented ink having about 30% to about 85% by weight water, a pigment in an amount from about 3% to about 45% by weight of the ink, a dispersant, such as glycerine, polypropylene glycol, or polyethylene glycol in an amount from about 1.0% to about 50% by weight. In an embodiment, the water-based pigmented inks may contain one or more dyes in an amount from about 100 ppm to about 2% by weight.

In an embodiment, the ink composition may be a solvent-based ink composition. A solvent-based ink composition may be considered an ink composition having more non-aqueous solvent than water. Solvent-based ink compositions may be either pigmented or non-pigmented and may be fat- or oil-based. Solvent-based inks typically include an organic solvent (ketone, alkanol, alkyl acetate, alkyl ester, alkyl-carboxylic acid) which permits the ink to adhere firmly to the substrate, the solvent drying rapidly so that the printed ink resists smudging or smearing allowing the printed substrate to be handled almost immediately after printing. The organic solvent readily dissolves the dye/pigment, providing a wide range of ink compositions to be used with the printing device. In an embodiment, the solvent-based ink composition may be pigmented and have a non-aqueous solvent such as glycerine, polypropylene glycol, or polyethylene glycol present in a range from about 15% to about 80% by weight, water present in a range from about 1% to about 20% by weight, and pigment present in an amount from about 5% to about 50% by weight.

In an embodiment, the edible ink may be an absorbing ink. An absorbing ink typically includes water, a pigment, a dispersant (such as a polyol) for the pigment, and may contain one or more non-aqueous solvents (such as one or more alcohols) and a dye. In an embodiment, the absorbing ink may be a water-based pigmented ink having about 30% to about 85% by weight water, a pigment in an amount from about 3% to about 45% by weight of the ink, a dispersant, such as glycerine, polypropylene glycol, or polyethylene glycol in an amount from about 1.0% to about 50% by weight. In an embodiment, the water-based pigmented inks may contain one or more dyes in an amount from about 100 ppm to about 2% by weight.

A nonlimiting example of an absorbing ink is a propylene glycol-based ink. Propylene glycol, known also as propane-1,2-diol, is usually a tasteless, clear, oily liquid that is hygroscopic and miscible with water, acetone, and chloroform. It is widely used in food applications because of its low toxicity, absence of colour and odor, excellent solvent characteristics and good emollient properties. Propylene glycol can also serve as a carrier for active ingredients and solvent in colors, emulsifiers, antioxidants and enzymes.

In an embodiment, the absorbing ink may contain propylene glycol, glycerine, water, one or more dyes, a stabilizing agent such as a polyglycerol ester, and a base such as sodium hydroxide. The propylene glycol may be present in an amount from about 5-95% by weight of the absorbing ink or any value therebetween. The glycerine may be present in an amount from about 5-95% by weight of the absorbing ink, or any value therebetween. The dye may be present from about 0.5% to about 5% by weight of the absorbing ink or any value therebetween. In an embodiment, the absorbing ink may contain about 45% by weight glycerine and about 55% by weight propylene glycol. One of ordinary skill in the art will appreciate that the ratio of propylene glycol to glycerine may be varied in order to increase/decrease the amount of dye dissolved in or otherwise dispersed within the absorbing ink.

In an embodiment, the ink composition may be a wax-based edible ink (also known as a hot-melt edible ink). A wax-based-ink may include a dye dispersed or dissolved in a fat, wax, or oil. The wax may include any food grade wax, including such nonlimiting examples as microcrystalline wax, paraffin, and natural or synthetic wax. In a further embodiment, the wax-based edible ink may include from about 3% to about 6% by weight of an edible dye, from about 10% to about 20% by weight of hydrogenated resins, and from about 74% to about 87% by weight of a wax such as candela wax, carnauba wax, microcrystalline wax, and combinations thereof.

The edible ink composition may contain a food grade dye or lake wherein specified amounts of the dye/lake may be ingested by a human without generally causing deleterious health effects. Examples of food grade compounds include those compounds "generally recognized as safe" ("GRAS") by the United States Food and Drug Administration ("FDA") and colorants approved by the FDA for use in foods for human consumption. The food grade dyes used to produce the colored fluids may include synthetic dyes, natural dyes, or combinations thereof. As used herein, the term "dye" denotes dyes which are soluble in water and/or in the other cosolvents, which contain substantial amounts of glycols and/or glycerine, employed in the present colored fluids. Nonlimiting examples of suitable synthetic dyes include food grade Pontamine, Food Black 2, FD&C-Red #3, FD&C-Red #33, FD&C-Red #40, FD&C-Blue #1, FD&C-Blue #2, FD&C-Yellow #10, FD&C-Yellow #5, FD&C-Yellow #6, and FD&C-Green #3. FD&C dyes that may be used include Red No. 3 (Erythrosine), Red No. 40 (Allura Red), Yellow No. 6 (Sunset Yel. FCF), Yellow No. 5 (Tartrazine), Green No. 3 (Fast Green FCF), Blue No. 1 (Brilliant Blue FCF), Blue No. 2 (Indigotine), and mixtures thereof. Suitable natural dyes include turmeric oleoresins, cochineal extracts, gardenia extracts, and natural colors derived from vegetable juices. Other nonlimiting examples of suitable natural dyes include beet extract, grape skin extract, and chlorophyll containing extracts (e.g. nettle extract, alfalfa extract and spinach extract). To achieve a desired color tint or shade, the colored liquids may include mixtures of more than one synthetic and/or natural food grade dye. In a typical embodiment, the colored fluids contain about 0.1 to 10 wt. % food grade dye on a dissolved solids basis.

In an embodiment, the ink composition may include additives such as flavorings, preservatives, antifoam agents, micronutrients, dispersion stabilizers, film formers, binders, a surface tension modifier, a thickening agent, an antioxidant, a preservative, a buffering agent, and/or an antimicrobial agent as commonly known the art. The ink composition may also include adhesion enhancers such as a surfactant or a film forming resin. The surfactant may be cationic, anionic, or amphoteric and may include such nonlimiting examples as polyglycerol oleate, monostearate, polysorbate, mono and diglyceride, and phospholipids such as lecithin. Nonlimiting examples of suitable film forming resins may include such edible resins as acrylic co-polymers, rosin esters, shellac, polyvinyl esters, ketone resins, urea aldehyde resins, vinyl chloride/vinyl ether or vinyl acetate co-polymers, cellulose ethers and esters, polyamide resins, styrene/maleate resins, polyvinylpyrrolidone resins, vinyl pyrrolidone/vinyl acetate co-polymers, polystyrene resins, melamine resins, thermosetting acrylic resins, polyurethane resins and radiation curable acrylate resins. The ink composition may also include an organoleptic component and/or an active agent as will be described in detail below.

It is understood that the ink composition may be compatible with the printing device so as not to damage the jetting head components or cause inconsistent firing of jets. The ink composition may also be compatible with the edible substrate to provide a high resolution ink-indicia that adheres to the edible substrate surface. In an embodiment, the ink is a solid or in a solid state at ambient temperature.

Printing device 32 may be placed anywhere along apparatus 10 to print, place, jet, or otherwise selectively eject an amount of ink composition onto all or discrete portions of slab 14, 14a confectionery pieces 24 or coated confectionery pieces 24a and form an ink-indicia thereon. Printing device 32 may be a single pass or a multiple pass printing device to form a single-color or multiple-color image on the substrate. For example, printing device 32 may be placed at location A to print an ink-indicia onto slab of edible substrate 14 downstream of extruder 12 and upstream of dusting device 18. Location A may be advantageous as contact between the ink composition and the slab 14 is not impeded by the presence of the dusting compound. Moreover, printing at location A may be beneficial as slab 14 is typically at an elevated temperature when exiting extruder 12. The elevated temperature of slab 14 may promote rapid drying of the ink composition.

In an embodiment, printing device 32 may be placed at location B, downstream of dusting device 18 and upstream of rollers 20. When printing device 32 is positioned at location B, a fast-drying, strong adherent ink may be used. Location B may be advantageous when distortion of the ink-indicia by rollers 20 is desired or non-detrimental to the finished printed comestible product. Location B may also be utilized when high resolution of the ink-indicia is not required. For example, the ink-indicia may be a strip, a streak or a simple geometric shape such as parallel lines, a circle, or polka dots, that does not lose shape and/or definition when expanded by sizing rollers 20.

In an embodiment, printing device 32 may be placed at location C, downstream of rollers 20 and upstream of cutting device 22. Printing device 32 may also be placed at location D, downstream of cutting device 22 and upstream of cooling device 26. At location D, downstream of cutting device 22 and upstream of cooling device 26, multiple sheets and/or multiple individual pieces may be printed with an ink-indicia with printing device 32. Location D may be advantageous as continuous individual pieces 24 may be at an elevated temperature prior to entering cooling device 26. The elevated temperature of pieces 24 may promote 1) drying of the ink composition and 2) adhesion of the ink composition to the edible substrate surface.

In an embodiment, placement of printing device 32 at location E, downstream of cooling device 26 and upstream of curing chamber 28, may be utilized when printing upon a hard or firm surface of the edible substrate is desired. Location E may be advantageous when a slow-drying ink is used. In an embodiment, apparatus 10 may include first and second printing devices. The first printing device may be located or otherwise disposed on a first side of the continuous supply of confectionery pieces 24 as denoted by E. The second printing device may be disposed on another side of the supply of pieces 24 as denoted by E'. In this configuration, first and second printing devices may print the edible ink composition onto opposing sides of pieces 24. The printing devices may be arranged in a top/bottom relationship. Alternatively, the printing devices may be arranged in a first side/second side relationship, such as first printing device on the left side of pieces 24 and second printing device on the right side of pieces 24. The first and second printing devices may deliver substantially simultaneously, the ink composition to opposing sides of the pieces. It is understood that multiple printing devices may be utilized anywhere along apparatus 10 to deliver ink composition to opposing sides of slab 14, pieces 24 or coated pieces 24a.

In an embodiment, printing device 32 may also be positioned at location F, downstream of coating device 30. At location F, the ink may include an adhesion enhancer, such as a wax for example, to promote adhesion with the coating surface of the coated comestible. In a further embodiment, printing device 32 may be positioned anywhere along or upon the packaging machine as desired. As herein described, the contents of ink composition and/or the printing device may be modified as necessary depending on the placement of the printing device along apparatus 10. The apparatus may include additional features and embodiments as disclosed in U.S. patent application Ser. No. 11/692,751 filed on Mar. 28, 2007, the entire content of which is incorporated by reference herein.

Figure 2:
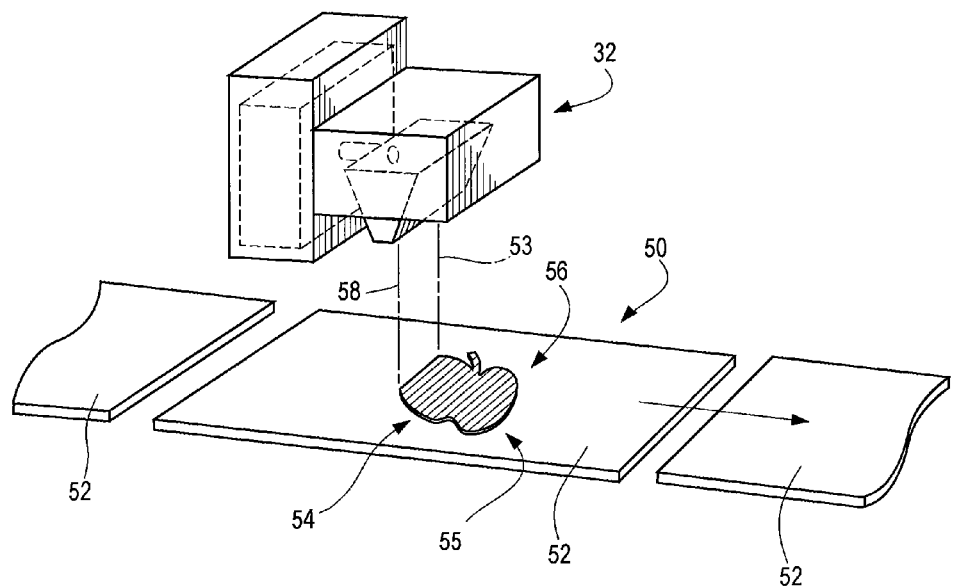
FIG. 2 is a perspective view of a printing device printing on an edible substrate of the present disclosure.

In an embodiment, printing device 32 may be used to form an edible product 50 as shown in FIG. 2. Edible product 50 may include an edible substrate 52 and an edible ink-indicia 54 formed from ink composition 53 printed from printing device 32 and onto the substrate 52. Ink-indicia 54 may include a feature 56. Printing device 32 may also dispense an organoleptic component 58 corresponding to feature 56 of ink-indicia 54. Consequently, edible product 50 may include an ink-indicia 54 with a feature 56 and an organoleptic component 58 corresponding to the feature.

In an embodiment, edible substrate 52 may be any edible comestible, material, or substrate as previously discussed herein. Edible substrate 52 may have planar surfaces, non-planar surfaces, or a combination of planar and non-planar surfaces. Edible substrate 52 may have a flat, a curved, a wavy, a convex (i.e., pellet, tablet, or bean-shaped), or a concave surface contour. The edible substrate may be coated or uncoated. In an embodiment, edible substrate 52 may be a confectionery material, such as a substantially flat stick of chewing gum as shown in FIG. 2.

As used herein, "ink-indicia" (or an "edible ink-indicia") is an ink mark or an ink indication on the edible substrate (or on the slab). Ink-indicia 54 may be any single color or multiple color edible ink or ink composition as discussed herein. Moreover, ink-indicia 54 may depict any symbol, object, alpha-numeric representation, letter, word, text, shape, fanciful shape, image, graphic, color, advertising indicia, or combination thereof as desired. Nonlimiting examples of suitable ink-indicia include images, photographs or pictures of people, characters, scenes, or landscapes; advertising indicia such as brand names, trade names, logos, trademarks, text slogans; a processing code such as a bar code; words; objects; or any combination thereof. In an embodiment, ink-indicia 54 may be an inkjet-indicia.

As used herein, "feature" is a property of the edible substrate, a characteristic of the edible ink-indicia, and combinations thereof. Nonlimiting examples of properties for the edible substrate include the structure of the edible substrate (single layer, multiple layer, center-filled, coated, uncoated, co-deposited, coextruded), the composition of the edible substrate, an ingredient in the edible substrate, the surface texture of the edible substrate (flat, substantially flat, convex, concave, curved, smooth, rough, wavy, contoured, irregular, jagged, indentations, protrusions), the hardness of the edible substrate (hard, soft, chewy, pliable), and combinations thereof.

Ink-indicia 54 may include a feature 56. Feature 56 may be any characteristic, aspect, attribute, component, element, quality, trait, or property, of ink-indicia 54. Feature 56 may include a portion of or all of ink-indicia 54. For example, FIG. 2 shows ink-indicia 54 disposed on the surface of edible substrate 52, ink-indicia 54 depicting an apple 55. As previously discussed, apple 55 may be a single color or multiple colors. In an embodiment, printing device 32 may eject the ink composition to discrete areas of edible substrate 32 as desired. For example, apple 55 may be a first color and the remaining areas of edible substrate 52 may be a second color. In an embodiment, feature 56 may entail the entirety of the ink-indicia, namely, the shape or image of the apple 55.

Edible product 50 also includes an organoleptic component 58 that corresponds to feature 56. Organoleptic component 58 may be any component that is perceptible by the senses. Thus, organoleptic component may be any component that may be perceived or detected visually, by touch (i.e., by hand, tongue, or mouthfeel), audibly (sound), taste, and/or by smell (aromatic). Nonlimiting examples of suitable organoleptic components include a flavoring agent, a cooling agent, a heating agent, a mouthfeel agent (a component with a rough, fizz, or particulate texture), a tingling agent (Jambu extract, Vanillyl alkyl ethers, Vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin, menthol glycerin ether, unsaturated amides and combinations thereof), a sweetening agent, a souring agent, a bittering agent, a teeth whitening agent, an anti-cavity agent, a breath freshening agent, an audible agent (a cracking, fizzing, or popping component), and combinations thereof.

Organoleptic component 58 corresponds to feature 56. In other words, organoleptic component may be any sensory component that may be associated with, or coordinated with feature 56. In particular, organoleptic component 58 may be any sensory-perceived component that typically accompanies, is associated with, complements, emphasizes, accentuates, highlights, matches, relates to, is in accord with, links with, or is connected to feature 56. In an embodiment, printing device 32 prints or otherwise jets organoleptic component 58 onto edible substrate 52. In a further embodiment, organoleptic component 58 may be disposed directly on ink-indicia 54 and/or feature 56. In yet a further embodiment, organoleptic component may be a component or element of the ink or ink component dispensed from printing device 32 and used to form ink-indicia 54. In yet another embodiment, printing device may dispense organoleptic component 58 to discrete portions of edible substrate 52 (i.e., onto apple 55) or onto the entire surface of edible substrate 52.

For example, FIG. 2 illustrates printing device 32 dispensing ink component 53 which forms ink-indicia 54 on the surface of edible substrate 52. Ink-indicia 54 includes feature 56, the shape of an apple, on the surface of edible substrate 52. Printing device 32 also dispenses organoleptic component 58 onto feature 56, namely apple 55. In an embodiment, organoleptic component 58 may be a flavorant such as an apple flavor, for example. Organoleptic component 58 may also include a souring agent, included with or distinct from the flavoring agent, that when placed in contact with a person's mouth delivers a sour taste or sour apple taste to the consumer. Edible product 50 advantageously provides a visually appealing product and a multi-sensory consumption experience, enjoyable to the consumer.

Figure 3:
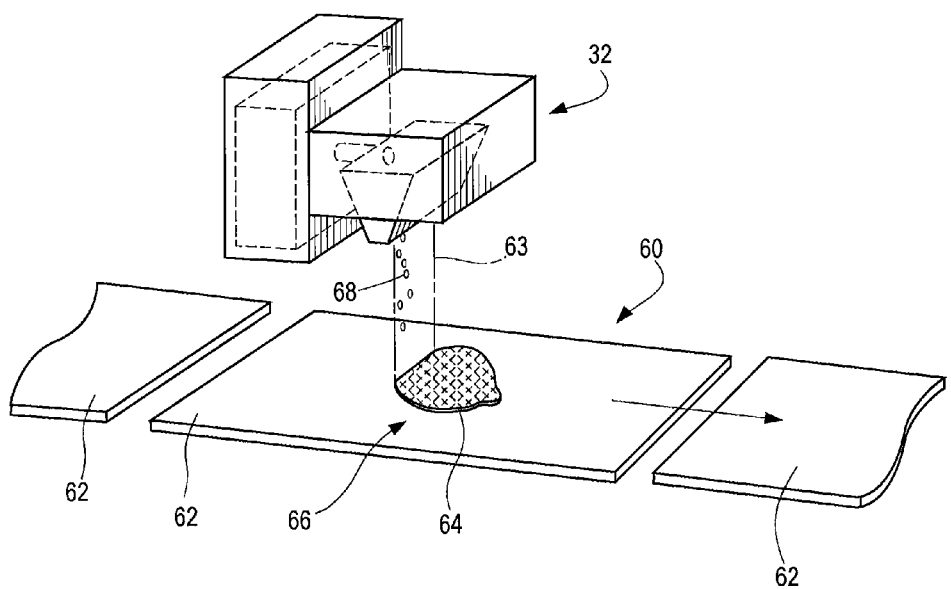
FIG. 3 is a perspective view of a printing device printing on an edible substrate of the present disclosure.

FIG. 3 shows printing device 32 being used to form edible product 60. Edible product 60 includes edible substrate 62 such as a chewy or soft candy with ink composition 63 dispensed from printing device 32 forming ink-indicia 64. Ink-indicia 64 has feature 66, namely the shape of a lemon. In this embodiment, edible substrate 62 may include a flavoring agent such as a lemon flavor, for example. Organoleptic component 68 may include a souring agent, such as citric acid dispensed from printing device 32 in either liquid or particulate form. Organoleptic component 68 may deliver a sour taste in conjunction with the lemon flavor when edible product 60 is placed in the mouth of a consumer. In a further embodiment, organoleptic component 68 may have a particulate or granular texture or rough mouthfeel when disposed upon the surface of edible substrate 62. This may occur as organoleptic component may be dispensed as a solid particulate or dispensed as a liquid that may dry with a granular texture. As organoleptic component 68 is disposed on the surface of edible substrate 62, organoleptic component 68 may deliver an instant and up-front sour sensation accentuated with a grainy mouthfeel of the souring agent to a person when consuming edible product 60. This may occur when the portion of edible substrate 62 having ink-indicia 64 comes into contact with the consumer's tongue. Thus, the consumer may associate the grainy mouthfeel of the particulate souring agent with the intense and instantaneous sour taste of the organoleptic component. Ink-indicia 64, feature 66, and organoleptic component 68 may thereby heighten consumer interest in product 60 by delivering an edible product with a visually attractive ink-indicia in conjunction with a corresponding sensory experience adding to the excitement of consuming the edible product.

In an embodiment, edible substrate 72 may be a stick of chewing gum. The chewing gum may include flavorants and sweeteners as are commonly known in the art. In an embodiment, organoleptic component 78 may be one or more mint flavoring agents and/or a cooling agent and may be a component of ink 73 or may be a distinct, stand-alone component dispersed separately from the ink component from printing device 32. In an embodiment, organoleptic component 78 may be a cooling agent. Nonlimiting examples of suitable cooling agents include menthol, p-mentha-3,8-diol, 1-isopulegol, menthone ketals, menthyl lactate, monomenthol succinate, menthyl pyrrolidone carboxylate, 3-1-menthoxypropane-1,2-diol (Takasago Cooling Agent, TCA), N-ethyl-p-menthane-3-carboxamide (WS-3), 2-isopropyl-N, 2,3-trimethylbutyramide (WS-23), other cyclic and acyclic carboxamides and 3,3,5-trimethylcyclohexanol, other like cooling agents, or mixtures thereof. In an embodiment, the organoleptic component 78, may be disposed on feature 76a, such as on the term "DOUBLEMINT," or alternatively, organoleptic component 78 may be disposed on the term "MINT." In another embodiment, organoleptic component 78 may be disposed on one or both of the arrowhead portions of feature 76b. Thus, organoleptic component 78, the cooling agent, accentuates the feature of the ink-indicia—namely the concept or expectation of a minty or cool taste sensation, particularly with the provision of an instantaneous wave or burst of cooling or mint sensation when edible product 70 is placed in a consumer's mouth. In yet a further embodiment, edible product 70 may include two organoleptic components—a cooling agent and one or more mint flavoring agents, for example—present anywhere on edible substrate 72 as previously discussed. Two or "double" organoleptic components jetted onto the surface of edible substrate 72 highlight and augment features 76a and 76b of ink-indicia 74. This advantageously increases the consumer's enjoyment when consuming edible product 70. Thus, organoleptic component 78 corresponds to feature 76a, 76b by accentuating, amplifying and highlighting a characteristic or property of the feature (mint=cool) and by playing on the meaning of the term depicted by ink-indicia 74. The edible product may include additional features and embodiments as disclosed in U.S. patent application Ser. No. 11/692,756 filed on Mar. 28, 2007, the entire content of which is incorporated by reference herein.

In an embodiment, printing device 32 may be used to form edible product 70 as shown in FIG. 4. Printing device 32 dispenses or jets ink component 73 onto edible substrate 72 to form ink-indicia 74. In this embodiment, the ink-indicia is an advertising indicia with multiple features 76. Advertising indicia 74 includes a text feature 76a as indicated by the term DOUBLEMINT. Advertising indicia 74 also includes feature 76b, a fanciful shape or logo, namely the two-headed arrow. Also dispensed from printing device 32 is organoleptic component 78 that may correspond or be associated with one of or both features 76a or 76b. Organoleptic component 78 may be disposed on ink-indicia 74, feature 76a or feature 76b. Alternatively, organoleptic component 78 may be disposed other portions of edible substrate 72.

In an embodiment, printing device 32 may include a dosing controller 71 as shown in FIG. 4. Dosing controller 71 may be in operative communication with printing device 32 to deliver a precise amount of organoleptic component to edible substrate 72. Dosing controller 71 may be a component of printing device 32 or a stand-alone unit. The skilled artisan will appreciate that with the provision of the organoleptic component concentration and provision of the jetted droplet volume dispersed from printing device 34, dosing controller 71 may be configured to deliver a precise amount of organoleptic component to the substrate. Thus, dosing controller 71 may be any data processor, flow regulator, flow rate sensor, timing device, or any combination thereof that may be configured with printing device 32 capable of controlling the number of jetted droplets of organoleptic component delivered to edible substrate 72. The organoleptic component may be a component of ink composition 73. Alternatively, the organoleptic component may be dispersed or dissolved in a carrier that does not include the ink composition. This carrier may be contained in a separate or dedicated reservoir and may be ejected either simultaneously with ink composition 73 or independently from ink composition 73.

In a further embodiment, dosing controller 71 may be used to dispense a precise amount of organoleptic component 78 onto edible substrate 72. As used herein "precision dose" or "precision dosing" is a quantity of a component (or the delivery of a quantity) that is within 0.01% of a predetermined quantity of the component. For example, when it is predetermined to add 1.0 g of a flavoring agent to the edible substrate, a precision dose would be from about 0.9999 g to about 1.0001 g of the flavoring agent. The edible product 70 may include a precision dose of ink composition 73, together or separate from organoleptic component 78, or a combination thereof.

In an embodiment, dosing controller 71 may be used to deliver a quantity of organoleptic component to within about 0.01% of a predetermined value. In a further embodiment, dosing controller 71 may be used to deliver an amount of organoleptic component not to exceed a predetermined value. This may be advantageous for the addition of organoleptic components with high efficacy or regulated organoleptic components which excess amounts are not permitted.

In a further embodiment, dosing controller 71 may include a weight detector 75. Weight detector 75, such as a scale for example, may be in operative communication with dosing controller 71 to detect the weight of edible substrate 72. Dosing controller 71 may dispense a quantity of organoleptic component droplets until a predetermined or threshold weight value is detected by weight detector 75. Upon detection of this predetermined weight value, dosing controller 71 may send a signal to printing device 32 to cease ejection of the organoleptic component.

In a further embodiment, weight detector 75 may be used to provide an initial weight of edible substrate 72. With a weight value of the edible substrate, dosing controller 71 may determine how many droplets need be dispensed in order to provide the edible substrate with a predetermined weight percentage of organoleptic component. In an embodiment, weight detector 75 may be used to weigh each edible substrate 72 before the addition of the organoleptic component. Based on the weight of edible substrate 72, dosing controller 71 may selectively dispense a precise number of droplets to provide each individual edible product 70 with 2.0% by weight of an organoleptic component, such as a cooling agent, for example. In an embodiment, dosing controller 71 may be used to deliver a quantity of organoleptic component within 0.01% of a predetermined value. Consequently, dosing controller 71 and weight detector 75 may be used to tailor the amount of dispensed ink composition or organoleptic component based on the individual weight of each edible substrate. Thus, a plurality of edible products may be formed, with each edible product having the same or nearly the same weight percentage of organoleptic component in each piece.

Utilization of dosing controller 71 is advantageous for the delivery of organoleptic components with high efficacy such as high intensity sweetening agents, flavoring agents, cooling agents, or active agents for example. Dosing controller 71 may also be used to precisely dose an active agent onto the surface of edible substrate 72. The active agent may be a medicament, a pharmaceutical, a drug, a medication, or any compound designed to be taken by a human as a medication to combat an illness or disease or to promote general health. The active agent may be a component of either the ink composition or the organoleptic composition. Consequently, the active agent may be a component of the ink-indicia and/or be disposed on or contact a feature of the ink-indicia. Alternatively, the printing device may dispense or eject the active agent as a discrete ingredient onto the edible substrate. Nonlimiting examples of suitable medicaments may include any drug, vitamin, stimulant or other chemical or compound which is used for health related purposes. In an embodiment, the active agent may be a beneficial bacteria such as a probiotic including such nonlimiting examples as *lactobacillus, Escherichia, enterococcus, streptococcus, bifidobacterium*, and *sacharomyces*. In a further embodiment, the active agent may be a plaque reducing agent.

In an embodiment, printing device 32, dosing controller 71, and/or weight detector 75 may be used to precisely dispense a microdose of an organoleptic component and/or an active agent onto edible substrate 72. As used herein, "microdose" is an ingredient, component, or agent having a mass from about 0.01 mg to about 1 g, or any value therebetween. A nonlimiting example of a microdose is a component having a mass from about 0.1 mg to about 100 mg (with or without a carrier). In an embodiment, printing device 32, dosing controller 71, and/or weight detector 75 may dispense any desired amount of an organoleptic component (such as a cooling agent, for example), in the range of 0.5 mg-3.0 mg. In a further embodiment, a 22 mg microdose of a plaque reducing agent may be dispensed onto edible substrate 72.

In an embodiment, printing device 32 may be used to form edible product 80 as shown in FIG. 5. Printing device 32 dispenses, ejects or jets ink component 83 onto edible substrate 82 to form ink-indicia 84. Edible substrate may be a soft candy or chewing gum. In this embodiment, the ink-indicia 84 may be a slogan. In an embodiment, ink-indicia 84 may include multiple features as each letter and/or word may be considered an individual feature as the size, font, layout and design of each letter/word may be varied as desired. Each letter or word may be printed with single or multiple colors that may be the same or different than the color(s) used to print the other letters or words. For example, the terms "Gotta Have" may be a first color or a first multiple color set and the term "Sweet?" may be a second color or a second multiple color set.

In an embodiment, edible product 80 may include feature 86 which may be the term "Sweet." An organoleptic component 88 may be jetted from printing device 32 onto any portion or discrete portions of edible product 80. In an embodiment, organoleptic component 88 may be a sweetening agent. The sweetening agent may be a sugar sweetener or may be sugar-free and/or a high-intensity sweetener. Nonlimiting examples of suitable sugar sweeteners include saccharide-containing components such as sucrose, dextrose, maltose, dextrin, dried invert sugar, fructose, levulose, galactose, corn syrup, corn syrup solids, and the like, alone or in combination, as are commonly known in the art. Non-limiting examples of sugar-free sweeteners may include sucralose, aspartame, salts of acesulfame, alitame, saccharin and its salts, neotame, cyclamic acid and its salts, glycyrrhizin, dihydrochalcones, thaumatin, monellin, and the like, alone or in combination.

In an embodiment, the sweetening agent organoleptic component 88 may be disposed on or contact the term "Sweet" or "Sweet?" on the surface of edible substrate 82. Organoleptic component 88 may advantageously provide an initial or up-front burst of sweetness when edible product 80 is placed in a consumer's mouth thereby bringing more enjoyment and excitement to the consumption of edible product 80. Organoleptic component 88 thereby corresponds to the "Sweet?" feature 86 of ink-indicia 84 by providing a sensory property (i.e., a sweet burst or sweet taste sensation) associated with the term "Sweet."

In an embodiment, printing device 32 may be placed in operative communication with a controller 100 to form edible product 90 having a high resolution image as shown in FIG. 6. Controller 100 may be any electronic data processing device and/or electronic data storage media such as a workstation, a personal computer, a laptop computer, a personal data assistant, or any other processing device alone or in conjunction with an electronic memory device, such as an electronic image storage device such as a computer, for example. Controller 100 may contain suitable hardware, software and/or logic to convert a stored electronic image into a series of commands in order to direct printing device 32 to selectively dispense or jet ink composition(s) onto the surface of edible product 90 to replicate or duplicate the electronic image on the surface of the edible substrate.

In an embodiment, a high resolution image stored in controller 100 operatively connected to printing device 32 may be used to apply a high resolution image onto edible substrate 90 as shown in FIG. 6. Controller 100 directs printing device 32 to selectively jet ink component 93 onto edible substrate 92 to form an ink-indicia 94 that may be a high resolution image. In an embodiment, edible substrate 92 may be a stick of chewing gum. Ink component 93 may be one or more inks. The high resolution image may or may not be multicolored. Ink-indicia 94 may include feature 96 that may be portions of or the entirety of high resolution image such as a landscape scene or a mountain range. For example, ink-indicia 94 may include feature 96a, a portion of the high resolution image, namely, the mountain top, or a snow-capped mountain top. Ink-indicia 94 may further include feature 96b, the mountain slope or mountain base that may be a different color or colors than mountain top feature 96a.

Printing device 32 may dispense one or more organoleptic components 98 to correspond with each feature. For example, the printing device may be used to dispense organoleptic component 98a that is associated with mountain top feature 96a. In an embodiment, organoleptic component 98a may be a cooling agent, a tingling agent, a fizzing agent, or a teeth whitening agent, for example. In a further embodiment, mountaintop feature 96a may be white in color or otherwise depict a snow-capped mountain top. Organoleptic component 98a may be dispensed anywhere on edible substrate 92. In yet a further embodiment, organoleptic component 98a may be selectively dispensed or jetted directly onto mountain top feature 98a. In this way, organoleptic component 98a advantageously highlights the mountain top feature 96a of ink-indicia 94. For example, organoleptic component 98a as a cooling agent highlights the cooling aspect of a snow-capped mountain. Organoleptic component 98a as a fizzing agent emphasizes the melting of snow on a mountain top.

In an embodiment, organoleptic component 98b may be selectively dispensed on feature 98b. Organoleptic component 98b may be a substance that may be further associated with mountains, the outdoors, or a rustic, organic, or nature-esque lifestyle. For example, organoleptic component 98b may be a breath freshening agent or a teeth whitening agent, or a combination thereof. Organoleptic component 98b thereby further emphasizes conceptions associated with landscape image ink-indicia 94, namely, a clean, good-smelling, good-feeling, outdoors aura and active, lively lifestyle. These properties of edible product 90 may promote or produce feelings of well-being, increased energy, increased motivation, increased self-assurance when edible product 90 is consumed by a person.

Figure 6A:
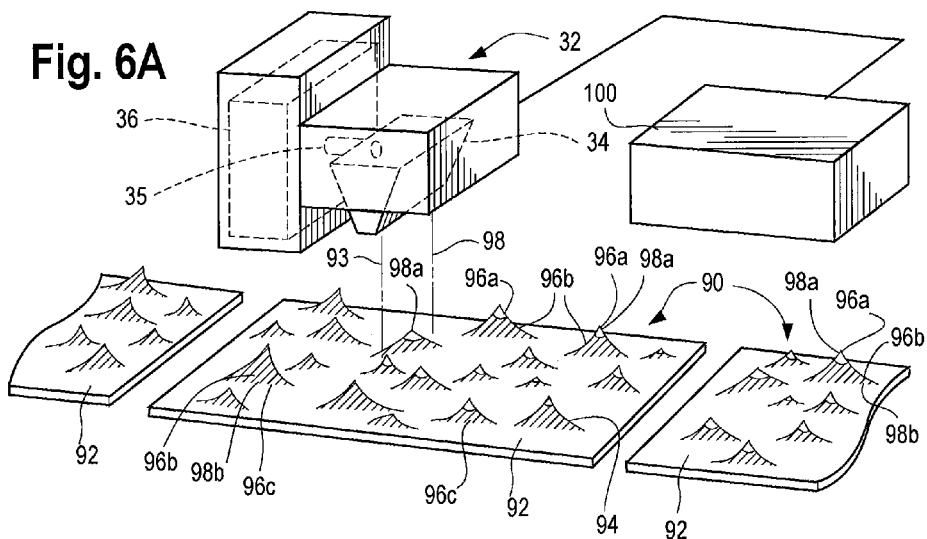
FIG. 6A is a perspective view of a printing device printing on an edible substrate of the present disclosure.

In an embodiment, ink-indicia 94 may include feature 96c, a surface embossment as shown in FIG. 6A. The surface embossment, may be any indentation, protrusion, etching, or similar structure on the surface of edible substrate 92. Protrusion 96c may be formed during the chewing gum production process. For example, an embossment may be imprinted upon the surface of edible substrate 92 during the sizing or sheeting process as is commonly known in the art. Feature 96c may be the sole feature corresponding to ink-indicia 94. Alternatively, feature 96c may be present in conjunction with other features, such as features 96a and/or 96b as shown in FIG. 6.

In an embodiment, feature 96c may be a protrusion in registration with or otherwise associated with ink-indicia 94. Protrusion 96c may be the material of edible substrate 92. Alternatively, protrusion 96c may be an additional edible material. In other words, ink-indicia 94 may be printed upon feature 96c to provide an edible product with a high resolution image of a landscape with three-dimensional features as well as organoleptic features corresponding to the ink-indicia. Features 98a and/or 98b may be selectively jetted directly onto feature 96c. For example, edible product 90 may include ink-indicia 94 of a mountain range printed upon feature 96c, protrusions, with the slope and tops of the protrusions corresponding to the mountain slopes of feature 96b and mountain tops of feature 96a of the mountain image of ink-indicia 94. Organoleptic components 98a and 98b may be added to ink-indicia 94 having features 96a, 96b, and 96c to further accentuate mountain top feature 96a and mountain slope feature 96b. Feature 96c may thereby provide a three-dimensional property to edible product 90. Edible product 90 with high resolution ink-indicia advantageously provides the appearance of one or more mountains rising from the surface of edible substrate 92 with the further trait of organoleptic components corresponding to the ink-indicia. Feature 96c improves consumer interest to edible product 90 and provides an additional mouthfeel sensory experience when edible product 90 is consumed.

Figure 7:
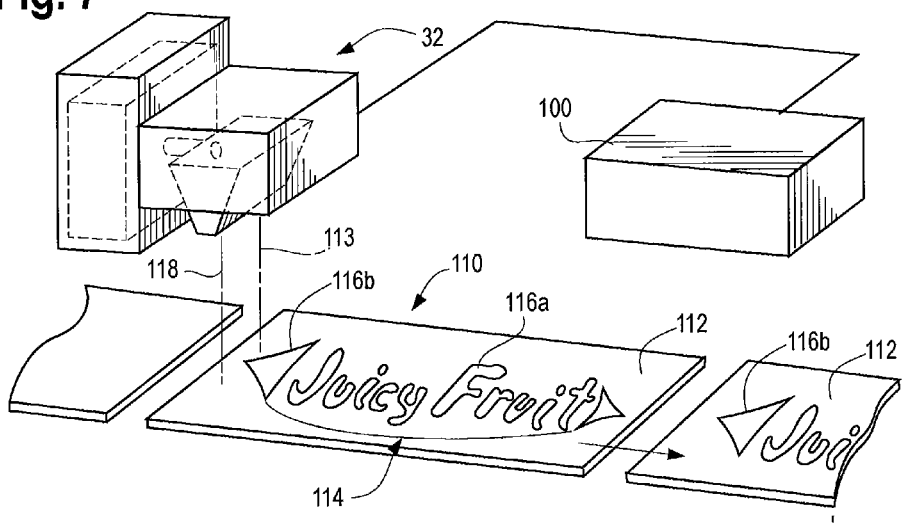
FIG. 7 is a perspective view of a printing device printing on an edible substrate of the present disclosure.

In an embodiment, controller 100 and printing device 32 may be used to apply a high resolution image onto edible substrate 110 as shown in FIG. 7. Printing device may eject or dispense one or more ink compositions 113 onto edible substrate 112 to print a high resolution ink-indicia 114 that may be an advertising indicia. In an embodiment, ink-indicia 114 may cover the entire area of the exposed surface of edible substrate 112. Advertising indicia 114 may be printed in both sides of edible substrate 110, fully covering the edible substrate. Advertising indicia 114 may have a high resolution, such as photographic image resolution, for example. In an embodiment, advertising indicia 114 may have a resolution of about 100 dpi or about 360 dpi or greater.

Advertising indicia 114 may have one or more features. For example, advertising indicia 114 in FIG. 7 includes feature 116a, the term "JUICY FRUIT," text in a decorative font, and a symbol, a double-headed fanciful arrow 116b. Edible product 110 may or may not include a surface-applied organoleptic component. In an embodiment, an organoleptic component 118 corresponding one or both features 116a, 116b may be dispensed from printing device 32 onto the surface of edible substrate 112. For example, organoleptic component 118 may be a fruit flavoring agent to emphasize the term "JUICY FRUIT" or "FRUIT." Organoleptic component 118 may be dispersed anywhere on edible substrate 112, or selectively dispersed on feature 116a, for example.

Figure 8:
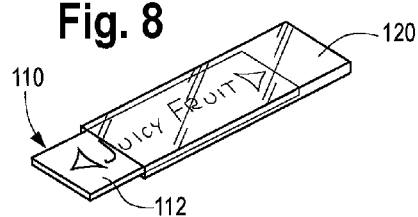
FIG. 8 is a perspective view of an edible product of the present disclosure.

In an embodiment, edible product 110 may be placed in a transparent, translucent, or otherwise see-through wrapper 120 as shown in FIG. 8. In a further embodiment, edible product 110 may be a stick of chewing gum. Wrapper 120 permits ink-indicia 114 to be viewed or otherwise seen through wrapper 120. In an embodiment, the resolution of ink-indicia 114 to is high enough to replicate or mimic the advertising indicia disposed on conventional opaque packaging substrates such as paper, plastic, foil, or packaging. Wrapper 120 may be made of any suitable transparent wrapping material such as a polymeric material, for example. Edible product 110 and wrapper 120 may replace conventional wrapping systems that conceal the product from view until the wrapper is opened.

Figure 9:
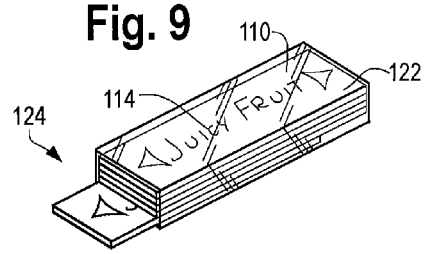
FIG. 9 is a perspective view of a printed edible product in a packaging of the present disclosure.

In a further embodiment, edible product 110 may be packaged in transparent package 122 with other products 110 as shown in FIG. 9. Package 122 may also be made of a transparent material permitting high resolution ink-indicia 114 to be seen through package 122. Each individual edible product 110 disposed in package 122 may or may not be individually wrapped in wrapper 120. Package 122 may include a tab 124 permitting access to the contents of the package. Edible product 110 with wrapper 120 and/or package 122 may advantageously eliminate the need for costly printed wrapping and packaging because of the visibility of advertising indicia 114 therethrough. Wrapper 120 and/or package 122 may thereby replace conventional opaque wrappers. Edible product 110 with wrapper 120 and/or package 122 may also increase consumer attention to edible product 110 because of the presence of the high resolution advertising indicia 114 directly on edible substrate 112 in conjunction with the absence of conventional packaging and wrapping. Thus, edible product 110 with high resolution advertising indicia 114 with or without wrapper 120 or packaging 122, may be utilized to pique consumer interest in the edible product and consequently increase sales of edible product 110. The edible product may include additional features and embodiments as disclosed in U.S. patent application Ser. No. 11/692,765 filed Mar. 28, 2007, the entire content of which is incorporated by reference herein.

In an embodiment, printing device 32 (either alone or in conjunction with controller 100) may be used to prepare edible product 130 as shown in FIG. 10. Edible product 130 includes coated edible substrate 132. The coating of edible substrate 132 may be a hard or soft panned sugar or sugar-free coating. Pan coating entails applying successive layers of syrup to a center material, such as a confectionery or chewing gum material, and rotating and drying the material in a rotating pan. The coating may also be a wax or other hydrophobic material or protective material alone or in combination with the pan coating as is commonly known in the art. In an embodiment, coated edible substrate 132 may be a coated chewing gum pellet.

Printing device 32 may eject an ink component 133 onto the surface of coated edible substrate 132 to form ink-indicia 134. Ink component 133 may include ingredients such as adhesion enhancers, wax and/or other components to promote adhesion to the surface of coated edible substrate 132. In an embodiment, printing device 32 selectively jets ink component 133 onto discrete areas of coated edible substrate 132 to form ink-indicia 134 having a feature 136 of a random pattern. An organoleptic component 138, which may or may not be an ingredient of ink component 133, may be dispensed by printing device 32 onto the surface of coated edible substrate 132. Organoleptic component may also include ingredients such as adhesion enhancers, wax, and/or other components to promote and ensure adhesion of the organoleptic component to the surface of coated edible substrate 132. In an embodiment, organoleptic component 138 may be disposed on or otherwise contact ink-indicia 134. Organoleptic component may correspond or otherwise accentuate, enhance or highlight ink-indicia 134. For example, ink-indicia 134 may be a cool color such as blue or white and organoleptic component 138 may be a cooling agent. Alternatively, ink-indicia 134 may be a hot color, such as red, and organoleptic component 138 may be a heating agent or a hot, or spicy flavoring agent such as cinnamon.

In an embodiment, printing device 32 may be used to prepare an edible product 140 in packaging 141 that includes a plurality of coated edible substrates 142a, 142b, and 142c each having respective ink-indicia 144a, 144b, 144c, respective features 146a, 146b, 146c and respective organoleptic components 148a, 148b, 148c disposed on the coating surface. For example, coated edible substrate 142a may include a blue ink-indicia 144a with random pattern feature 146a and organoleptic component 148a corresponding the blue color, such as a blueberry flavoring agent. Coated edible substrate 142b may include an orange ink-indicia 144b with random pattern feature 146b and an organoleptic component 148b associated with an orange color such as an orange flavor. Coated edible substrate 142c may include a green color ink-indicia 144c with random pattern feature 146c and an organoleptic component 148c corresponding to green such as a lime flavoring agent. One ordinary skill in the art will appreciate the number of combinations between ink-indicia, features and organoleptic components for the individual edible pieces is limited only by one's imagination. Packaging 141 may be made of a transparent or translucent material permitting the individual coated edible substrates within packaging 141 to be viewed or otherwise be visible from the packaging exterior. A feature of edible product 140, namely, the provision of multiple individual pieces—each piece with a random color, pattern and flavors—corresponds with and is further emphasized by random patterns of features 146a, 146b, 146c. The random patterns, colors, flavors and combinations in which the individual coated edible substrates may be consumed advantageously heightens consumer interest in edible product 140 and increases sales thereof.

In an embodiment, printing device 32 may be used to form edible product 150 as shown in FIG. 12. Edible product 150 may include coated edible substrate 152 upon which printing device 32 may selectively dispense first ink component 153a and second ink component 153b to form multicolor ink-indicia 154. Ink-indicia 154 may include a feature 156 that is a multicolored random pattern. Controller 100 may be used to cooperatively and selectively jet ink components 153a and 153b so as to cover substantially the entire surface of the coating. In an embodiment, feature 156 may be a random pattern of first ink composition 153a and a random pattern of second ink composition 153b, the ink compositions cooperatively ejected or in registration with each other so as not to contact the same portion of the coating surface. Alternatively, controller 100 and printing device 32 may jet ink compositions 153a, 153b in an overlapping manner at discrete portions the coated surface to create select regions of a third color on the surface of coated edible substrate 152.

A first organoleptic component 158a may be selectively dispensed by printing device 32 onto regions where first ink composition 153a is present. A second organoleptic component 158b may be selectively dispensed upon second ink composition 153b regions in a similar manner. In an embodiment, first organoleptic component 158a may be an ingredient of ink composition 153a and second organoleptic component 158b may be an ingredient of second ink composition 153b. Accordingly, each organoleptic component may be simultaneously dispensed its respective ink component.

In an embodiment, each organoleptic component corresponds to or otherwise accentuates the ink composition or feature with which it is associated. For example, first ink composition 133a may be a yellow color and first organoleptic component 138a may be a flavoring agent corresponding to yellow, such as a lemon flavoring agent, for example. Second ink composition 133b may be a clean color, such as white color and second organoleptic component 138b may have a clean or cleaning property such as breath freshening agent or a teeth whitening agent to accentuate the clean color. Edible product 150 provides a multiple colored coated edible product having a distinct surface characteristic and appearance. The multiple colored ink-indicia with random pattern feature and a plurality of organoleptic components all disposed on the coated surface advantageously provides an attractive comestible product to consumers.

In an embodiment, an apparatus 200 for preparing an edible substrate with a three-dimensional object is provided as shown in FIG. 13. Apparatus 200 includes a dispensing device 202 and a base 204. Base 204 supports a substrate 206 below dispensing device 202. Substrate 206 may be any edible substrate as previously discussed herein. Dispensing device 202 dispenses an edible material 208 onto substrate 206 in a layer by layer or an incremental manner to form or build a three-dimensional object on the surface of substrate 206.

Edible material 208 may be any edible material or substance as previously discussed herein. It is understood that edible material 208 is flowable or otherwise placed in a fluid or flowable state when dispensed from dispensing device 202. In an embodiment, a hopper 210 may be placed in fluid communication with dispensing device 202 by way of conduit 214. Hopper 210 with receptacles 212 may be used to contain edible materials that are solid or non-flowable at ambient conditions. Heating elements 216 may be used to heat materials held within hopper 210 to maintain these materials in a flowable state. Conduit 214 may be a multiple channel conduit to deliver a plurality of flowable edible materials to dispensing device 202. A flow regulator such as a pump 218 for example, may be operatively connected with hopper 210 and/or conduit 214 to deliver flowable edible material to dispensing device 202.

Dispensing device 202 may be supported by support system 220 to move dispensing device 202 in a horizontal (crosswise) manner as indicated by arrows G and H respectively. Support system 220 may also move dispensing device in a vertical (up and down) manner. Support system 220 enables dispensing device 202 to be movable with respect to base 204 and substrate 206. Alternatively, dispensing device 202 may be stationary and base 204 may be movable to move substrate 206 with respect to dispensing device 202.

In an embodiment, dispensing device 202 may be a non-contact printing device such as any ink jet printing device as described herein. In a further embodiment, dispensing device 202 may be substantially similar to ink jet printing device 32. Dispensing device 202 may be adapted to jet or eject edible ink compositions as well as other edible materials. Reservoirs 222 may contain edible ink or may be adapted to contain any other flowable edible material as discussed herein. Dispensing device 202 may be further adapted to receive and subsequently jet or eject flowable edible material transported through conduit 214. In an embodiment, dispensing device 202 may eject a single fluid containing a plurality of edible materials. Alternatively, dispensing device 202 may include nozzles dedicated to dispense different flowable edible materials. For example, dispensing device 202 may include first nozzles dedicated to the ejection of ink compositions and second nozzles dedicated to the ejection of other fluid edible materials. Dispensing device 202 may dispense one or more different types of edible materials either simultaneously or sequentially.

In an embodiment, a controller 224 may be in operative communication with dispensing device 202. Controller 224 may be any data processing device, such as a computer, that may generate three-dimensional coordinate data of an object, convert this data into commands, and deliver these commands to support system 220 and dispensing device 202 in order to form the three-dimensional object. Responsive to commands generated by controller 224, support system 220 may move dispensing device 202 to pass over substrate 206 and sequentially dispense layers of flowable edible material 208 to build or form a three-dimensional (3-D) object 226 on substrate 206. The three-dimensional object may be any shape, size, design, or symbol as desired. Object 226 may include any feature and corresponding organoleptic component or color(s) as previously discussed herein. The presence of 3-D object 226 on edible substrate 206 advantageously piques consumer interest in the edible product and promotes or otherwise contributes to the increase of sales of the edible product.

Figure 13A:
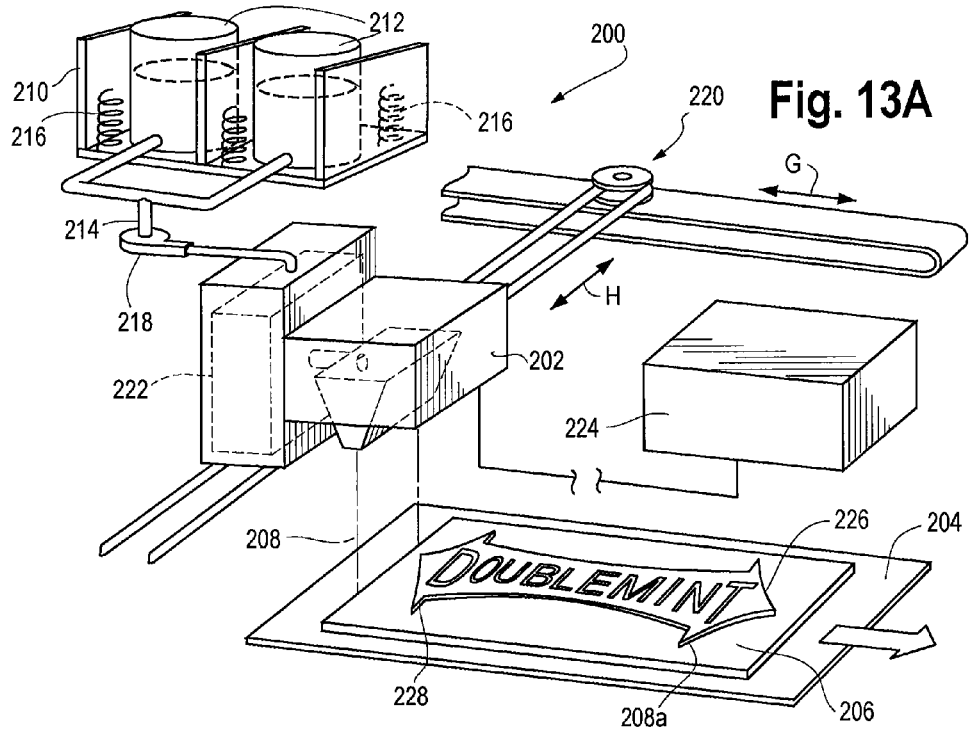
FIGS. 13A, 13B, and 13C each are a perspective view of an apparatus dispensing an edible material onto an edible substrate of the present disclosure.

FIG. 13A shows an initial phase of the 3-D object formation. In the initial phase, dispensing device 202 passes over substrate 206 and dispenses a first layer of flowable edible material 208 to form a base portion or base layer 208a of object 226. In other words, the initial pass places flowable edible material 208 in direct contact with the surface of substrate 206. Once flowable edible material 208 contacts substrate 206, it may dry and/or cool to a non-flowable phase or state and become a non-flowable edible material.

Figure 13B:
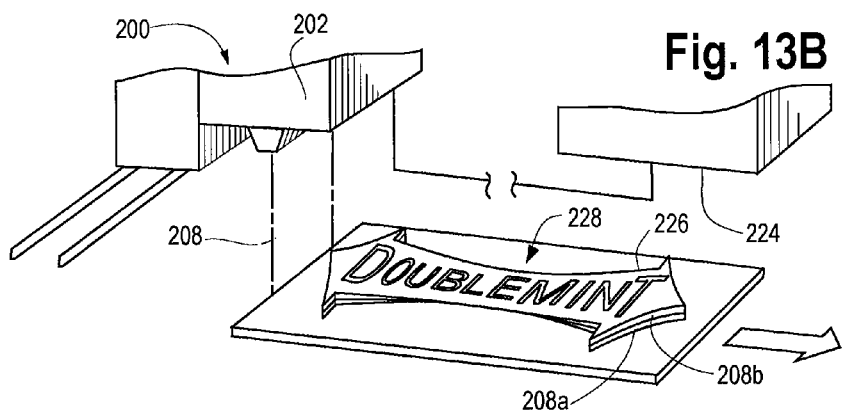
Figure 13C:
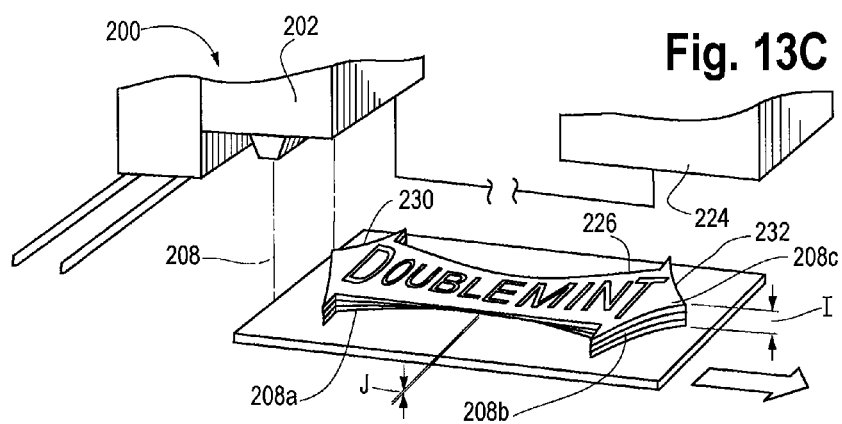

In an embodiment, object 226 may be a 3-D advertising indicia 228 built upon edible substrate 206 which may be a stick of chewing gum as shown in FIGS. 13A-13C. In an embodiment, flowable edible material 208 may be any confectionery material or chewing gum component having a non-flowable or solid state at ambient conditions or be dispersed or dissolved in a solution that may dry, at ambient, to a non-flowable or solid state. Nonlimiting examples of suitable edible materials include any confectionery material that may be placed in a fluid or flowable state as described herein. Further suitable materials for the edible material include elastomers; resin tackifiers; waxes; fats; mineral fillers; polysaccharides; gelatin; sugars; softeners such as glycerin, lecithin; hydrocolloids such as gum arabic, guar gum, cyclodextrin, celluloses, carrageenan, and agar; starch; and pectins. In addition, edible material 208 may be any ink component and/or organoleptic component as previously described herein. Dispensing device 202 may dispense ink, organoleptic components, from respective dedicated nozzles or jets. Alternatively, a single dispensable fluid may be prepared containing a plurality of desired edible materials. This single fluid may then be selectively dispersed from the dispensing device to form object 226.

During a middle phase of object formation, dispensing device 202 may apply middle layer of edible material 208b onto substrate 206 as shown in FIG. 13B. It is understood that layer 208b may a single layer or a plurality of layers. During the middle phase, dispensing device jets additional edible material 208 onto layer 208a to form additional middle layer or layers 208b on object 226. Layer 208b builds-up or increases the height of object 226. In an embodiment, application of layer 208b further defines the size and shape of advertising indicia 228. For example, with middle layer 208b, voids in the application of edible material are visible. As can be seen from FIG. 13B, the voids correspond to the text DOUBLEMINT in advertising indicia 228.

During a final phase of object formation, dispensing device 202 may apply a top layer 208c onto layer 208. It is understood that top layer 208c may include one or more individual layers of edible material 208. Top layer 208c may complete formation of 3-D object 226. Multiple layers 208a, 208b, and 208c thereby form a multiple layered structure which correspondingly forms 3-D object 226. In an embodiment, application of top layer 208c onto discrete areas of middle layer 208b completes the formation of the text voids and further completes the shape and size of advertising indicia 228. One of ordinary skill in the art will realize that base layer 208a and/or middle layer 208b may also be the top layer at certain portions of object 226 where a middle layer and/or a top layer are not applied as desired. 3-D object 226 may be formed on a single surface of edible substrate 206 or on each of the opposing surfaces of substrate 206.

In a further embodiment, the amount of edible material 208 applied to form layers 208a, 208b, 208c may vary at different areas of object 226 as desired. In an embodiment, the layer heights may be adjusted to form 3-D advertising indicia 228 a height I greater at arrowhead ends 230, 232 than a height J in a middle portion 234 of the advertising indicia as shown in FIG. 13C. The composition of edible material 208 may be varied to form a 3-D object having any color, ingredient, texture, and/or flavor, as desired. In a further embodiment dispensing device 202 may be used to add layer(s) of edible material to any type of embossment (e.g., protrusion, indentation) present on the substrate. In an embodiment, edible material 208 may be added to an indentation present on edible substrate 206. The edible material may coat the indentation. Thus, the 3-D object may be considered the coating of the indentation.

Figure 14A:
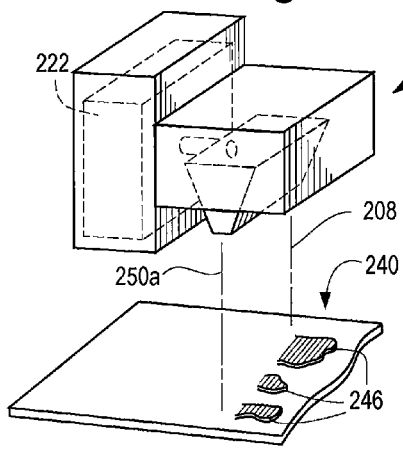
FIGS. 14A and 14B are each a perspective view of an apparatus dispensing an edible material onto an edible substrate of the present disclosure.
Figure 14B:
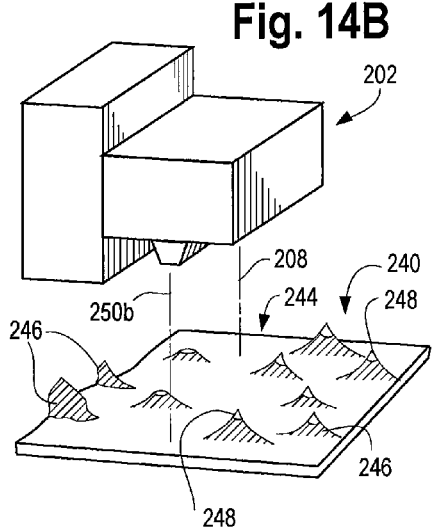

In an embodiment, edible product 240 may include edible substrate 242 and 3-D object 244 disposed thereon. Object 244 may be a 3-D representation of an image such as a landscape or mountain range as shown in FIGS. 14A and 14B. Object 244 may be layer-formed onto edible substrate 242 using dispensing device 202 and may include a plurality of colors and a plurality organoleptic components. For example, edible component 240 may be dispensed to form mountain bases 246. Dispensing device 202 may also eject first color(s) and first organoleptic component(s) 250a during formation of mountain bases 246. During layer-by-layer formation of mountain tops 248, dispensing device 202 may eject or jet second color(s) and/or second organoleptic component(s) 250b. In an embodiment, the first organoleptic component may correspond to the mountain bases 246 and the second organoleptic component may correspond to the mountain tops 248 as previously discussed herein. The apparatus may include additional features and embodiments as disclosed in U.S. patent application Ser. No. 11/692,769 filed on Mar. 28, 2007, the entire content of which is incorporated by reference herein.

In an embodiment, a method of increasing sales of an edible product is provided. The method includes providing an edible product and printing an ink-indicia associated with an event on the edible substrate to form an event product. The event product may then be distributed to a consumer.

The edible product may be any edible material or edible substance as previously described herein. Similarly, the ink-indicia may be any ink-indicia as previously described. The ink-indicia may be associated with an event. In other words, the ink-indicia may be any indicia that corresponds to, identifies, emphasizes, highlights, describes, details, augments, accentuates, links, denotes, or suggests, a particular event. The ink-indicia may be applied to the edible product to form the event product by any method as herein described. In an embodiment, the ink-indicia may be ink jet printed upon a surface of the edible product. In a further embodiment, the ink-indicia may include an organoleptic component. Provision of the event product advantageously piques a consumer's interest in the edible product that otherwise may not be linked to an event. Associating an edible product with a particular event may establish a new market segment for the edible product and correspondingly increase sales of the product. Indeed, the event product may also be considered a novelty item and advantageously become a consumer collection item.

The event may be any occurrence, happening, activity, social activity, affair, celebration, ceremony, incident, that may be identifiable by a person or a consumer. The event may be an international activity (i.e., the Olympics or World Cup) or a nationally recognized event (i.e., presidential election) known or identifiable to a large number of people. Alternatively, the event may be known to only a small segment of society or a small number of people, club or private organization, such as a trade show or a family reunion, for example. Nonlimiting examples of suitable events include a current event (such as a hostage being freed); a sports event; a holiday (St. Valentine's Day, the Fourth of July), a religious event, a political event such as a campaign, a speech, or a local, regional, state, or federal election; a judicial ruling (Martha jailed!); a seasonal event such as the Grammies or the Oscars; a cultural event such as a music performance, an art exhibit, a movie, or a television program; and combinations thereof.

The event product may be distributed or otherwise provided to a consumer or potential consumers as is commonly known in the art. Nonlimiting examples of suitable distribution or ways by which the event product may be made available to or delivered to consumers includes distribution to retail stores, purchase or ordering from Internet sites, catalogs, mailings, and free sample product distributions.

Figure 15A:
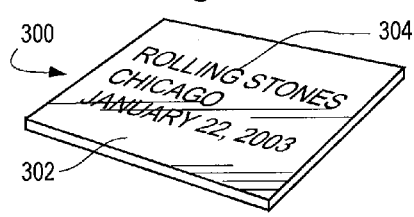
FIG. 15A is top perspective view of an event product of the present disclosure.
Figure 15B:
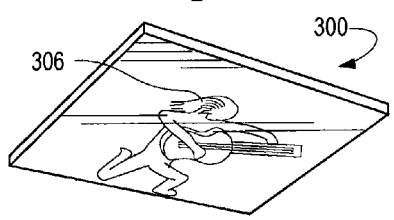
FIG. 15B is a bottom perspective view of the event product of FIG. 15A.

In an embodiment, the distribution of the event product may occur during a time period of before the event, during the event, or after the event. For example, event product 300 includes edible product 302 and an ink-indicia 304 associated with a cultural event, namely a music concert as shown in FIGS. 15A and 15B. In an embodiment, edible product 302 may be a confectionery product or a chewing gum product. Ink-indicia 304 may be an ink-jetted indicia printed upon the surface of event product 300. Furthermore, ink-indicia 304 may be associated with the event by providing text identifying the musical group, the date, and the location of the event. Event product 300 may include feature 306, such as an image of a music performer. Feature 306 may be on the same side as ink-indicia 304 or on an opposing side of the event product as shown in FIG. 15B.

In an embodiment, event product 300 may be distributed, made available to, and sold to consumers before the event (i.e., before the musical performance). For example, event product 300 may be available and/or displayed at vending stands or vending machines, or by vendors located at the concert hall where the musical performance is to occur. Indeed, event product 300 may thereby be distributed or otherwise be available to consumers before, during, and after the musical performance at the event venue.

Figure 16:
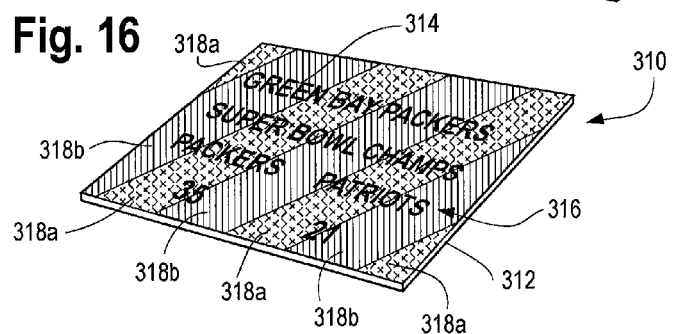
FIG. 16 is a perspective view of an event product of the present disclosure.

In an embodiment, the method may include awaiting a result of the event and printing the result on the edible product. The resultant event product may then be distributed to consumers within a short time period after the result or occurrence of the event. As shown in FIG. 16, event product 310 includes edible product 312 and ink-indicia 314 associated with a sports event. Ink-indicia 314 may be text that associates the ink-indicia to the sports event by identifying the sports event and the teams participating therein. Ink-indicia 314 may also include a result of the event 316, such as a score. Event product 310 may further include features 318a, 318b, such as first and second team colors (e.g., green and gold) of the victorious team. Features 318a, 318b may further accentuate or emphasize the event and/or the result.

In an embodiment, the production of event product 310 may occur immediately upon completion of the result and/or the event. In an embodiment, the result may be printed on the edible substrate within about one second to about 24 hours of the occurrence of the result. Event product 310 may then be quickly distributed and/or made available to consumers shortly after completion of the event. In an embodiment, event product 310 may be produced and distributed to consumers within less than several days, or less than 24 hours or within 1 minute to about 24 hours after the occurrence of the event and/or event result. The event need not be limited to a sports event. One of ordinary skill in the art will recognize that the method may be readily applicable to political elections, current events, movie premieres and other events with time-sensitive results associated therewith.

The skilled artisan will appreciate the advantages offered by rapidly producing and distributing an edible product associated with an event to consumers shortly after completion of the event. Provision of event product 310 to consumers within 24 hours of an event (particularly an event with a time-sensitive result such as a sports score, election result or current event) advantageously increases sales of the edible product by providing the product when consumer attention is focused on the event. Provision of a time-sensitive event result (such as a sports score) with the event product further grabs consumer attention of the product translating into increased sales of the product. Thus, the conversion of a conventional edible product into an event product may increase sales of the current product. Relating a conventional edible product to an event may also expand the market segment of the product and increase the number of target consumers for the edible product vis-à-vis the event product.

In an embodiment, a method of advertising is provided. The advertising method entails providing an edible product and printing an ink-indicia associated with an event on the edible substrate to form an event product. The method further includes providing an advertising indicia on the event product to form an event product advertisement. The advertising indicia may be applied with the ink-indicia. Alternatively, the advertising indicia may be provided either before or after application of the ink-indicia. The advertising indicia may or may not be an ink jet print indicia. The event product advertisement may be distributed before, during, and/or after an event as previously discussed.

Figure 17A:
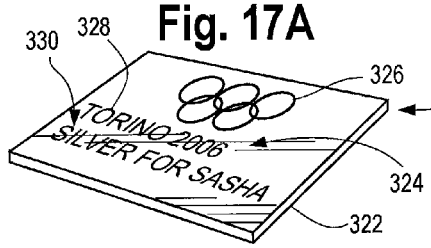
FIG. 17A is a top perspective view of an event product advertisement of the present disclosure.

In an embodiment, event product advertisement 320 includes an edible product 322 and an ink-indicia 324 associated with an international event, such as the Olympics for example, disposed on a first side of the edible product as shown in FIG. 17A. In an embodiment, edible product 322 may be a confectionery or a chewing gum product. Ink-indicia 324 may be associated with the event by way of a symbol 326, such as the Olympic rings, as well as text 328 identifying the location and time of the event. Event product advertisement 320 may also include a result 330 that occurred during the event (i.e., silver medal for skater Sasha Cowen).

Figure 17B:
FIG. 17B is a bottom perspective view of the event product advertisement of FIG. 17A.

An advertising indicia 332 may be disposed on another side of edible product 322 as shown in FIG. 17B. In an embodiment, advertising indicia 332 may be ink jet printed upon the edible product 322. Advertising indicia 332 may be any advertising indicia as described herein and may include one or more features and one or more organoleptic components corresponding to the respective features. In an embodiment, event product advertisement 320 may be packaged in transparent packaging as previously discussed.

Figure 18:
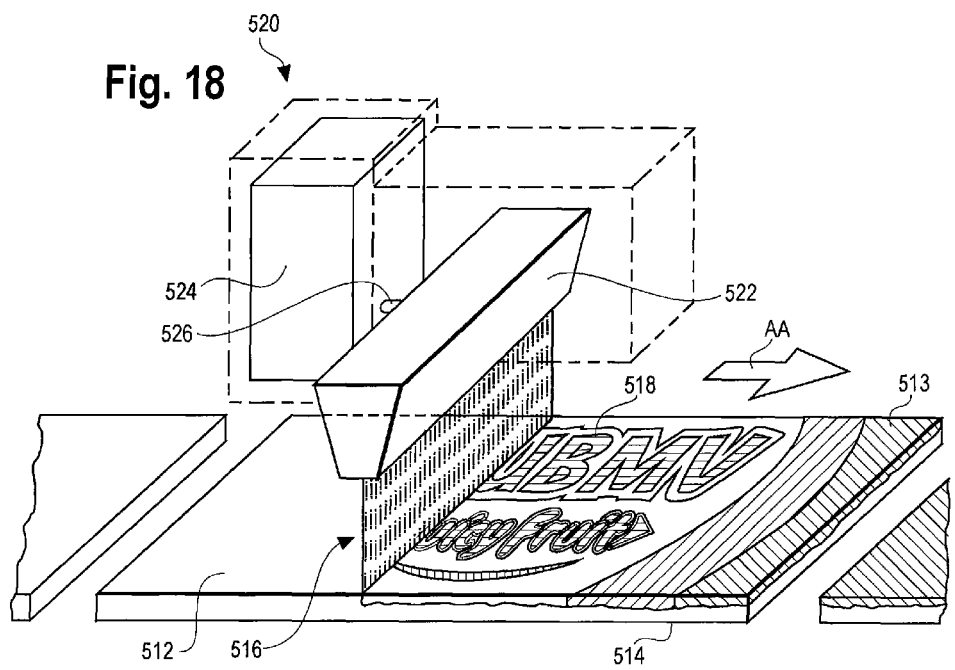
FIG. 18 is a perspective view of a printing device and an edible substrate of the present disclosure.

In an embodiment, a confectionery product 510 is provided as shown in FIG. 18. The confectionery product 510 may include an edible substrate 512 having a first surface 513 and an edible ink 516 dispensed from a printing device 520 onto the first surface 513 of the edible substrate 512 forming an edible ink-indicia 518. In this embodiment, the edible substrate may also have a second surface 514 opposing the first surface 513. The edible ink 516 may be applied to one or both of the surfaces 513, 514. Moreover, the edible ink 516 may be applied to one or both surfaces 513, 514 so as to cover at least about 5% of either or both surfaces 513, 514, or from about 5% to about 100% of either or both surfaces 513, 514 or any value therebetween. In an embodiment, the edible ink 516 may cover at least about 50% of either or both surfaces 513, 514, or from about 50% to about 100% of either or both surfaces 513, 514 or any value therebetween. In a further embodiment, the edible ink 516 may cover from about 75% to about 100% or about 75%, of either or both surfaces 513, 514 or any value therebetween. In yet another embodiment, the edible ink 516 covers about 100%, or 100%, of either or both surfaces 513, 514.

As is also shown in FIG. 18, the printing device 520 for printing the edible ink 516 is used to apply the edible ink 516 onto the surface of the edible substrate 512 to form the edible ink-indicia 518. A transport device such as a conveyor (not shown) may move the edible substrate 512 under the printing device 520 as shown by direction arrow AA. Alternatively, the edible substrate 12 may be stationary with the printing device 20 being movable over the edible substrate 512.

The printing device 520 may be any non-contact printing device disclosed herein. For example, the non-contact printing device may be a spray device. In an embodiment, the printing device 520 may be an edible inkjet printing device. Similarly, the edible ink 516 may be an edible inkjet ink as discussed herein. It is understood that the printing device 520 may be configured to dispense or jet ink compositions or other fluids therefrom. Indeed, any jettable fluid may be dispensed from printing device 520. A "jettable" fluid or material may be any material (solid or liquid) that has properties sufficient to allow the material to be selectively deposited by an inkjet material dispenser as is commonly known in the art. Inkjet printing is advantageous, particularly with respect to comestibles as it provides 1) high resolution printing and 2) non-contact with the comestible thereby avoiding the risk of damage to the confectionery product.

The printing device 520 may include one or more printing heads 522 in fluid communication with one or more or more reservoirs 524 by way of a channel 526, as shown in FIG. 18. The reservoirs 524 may contain an edible ink so that the printing device 520 may print an edible ink onto an edible substrate. The printing device 520 may be configured with more than one reservoir 524, each reservoir 524 containing an edible ink in typical colors such as cyan, magenta, yellow, and black or white in order to provide multiple color images and depending on the number of colors desired. Similarly, in an embodiment, the printing device 520 may be configured with four printing heads 522. Each printing head 522 may include one or more nozzles as previously discussed herein. Each printing head 522 may be in fluid communication with one or more fluid reservoirs 524. The printing heads 522 may be arranged in any desired manner to deliver an edible ink-indicia onto an edible substrate. For example, the printing heads 522 may be arranged in a single line. Alternatively, the printing heads 522 may be arranged in a series of lines to form a matrix-type printing profile. The printing device 520 may be a single pass or a multiple pass printing device to form a single-color or multiple-color image onto an edible substrate. In an embodiment, the printing device 520 is a single pass device that traverses an edible substrate once during printing.

The printing device 520 may consist of any number of color-jets in an assembly. More specifically, the printing device may consist of a four-color jet assembly in an eight wide by four deep arrangement. In an embodiment, the printing device 520 may include 256 nozzles per 2.8 inches (vertical), or about 91 nozzles in the vertical direction. The width of each ejected dot may be from about 0.0166 inches to about 0.0037 inches (horizontal). In other words, the ink may be dispersed in the horizontal direction from about 60 dots per inch to about 400 dots per inch or any value therebetween. The drop volume of the edible ink through the print heads may be approximately 80 pL. The skilled artisan will appreciate that the ink concentration is dependent upon 1) the rate or speed in which the edible substrate 512 passes under the printing device 520 and 2) the rate in which the print head assembly ejects the ink droplets. Thus, the printing device is capable of ejecting 36,400 dots per square inch (91 vertical× 400 horizontal). The dot concentration upon the edible substrate 512 may be varied as desired. For example, operating the print head at about 10% capacity yields an ink concentration of about 3600 dots per square inch. In another example, operating the print head assembly at 25% capacity yields an ink concentration of 9100 dots per square inch on the edible substrate 512. Thus, the dot concentration upon the edible substrate 512 may be from about 3600 dots per square inch to about 36,400 dot per square inch, or any value therebetween.

In an embodiment, the printing resolution may be from about 60 dots per inch to about 400 dots per inch or any value therebetween. In an embodiment, the printing resolution may be from or about 60 dots per inch to about 120 dots per inch, or about 100 dots per inch per color.

Any of the printing devices described herein may print have high resolution printing capacity. As used herein, "high resolution" is a horizontal dot concentration greater than 100 dpi to about 400 dpi, or any value therebetween. Thus, a non-limiting example of a high resolution image is an image having a dot concentration from about 9100 dots per square inch (91 vertical nozzles×100 dpi) to about 36,400 dots per square inch (91 vertical nozzles×400 dpi), or any value therebetween.

It is understood that the edible ink 516 may be compatible with the printing device 20 so as not to damage any printing head components or cause inconsistent firing of jets. The edible ink 516 may also be compatible with the edible substrate 512 to provide a high resolution edible ink-indicia 518 that adheres to the edible substrate 512.

In an embodiment, the printing device 520 delivers the maximum amount of artificial colorants allowed by a regulatory agency such as the FDA, EEC or similar governmental agency. Thus, provision of the edible substrate 532 with the edible ink 536 applied thereto yields a confectionery product will all, or substantially all, of the color on the outer surface. This advantageously provides a confectionery product having an extremely vibrant color that is both aesthetically pleasing and highly attractive to consumers.

Figure 19:
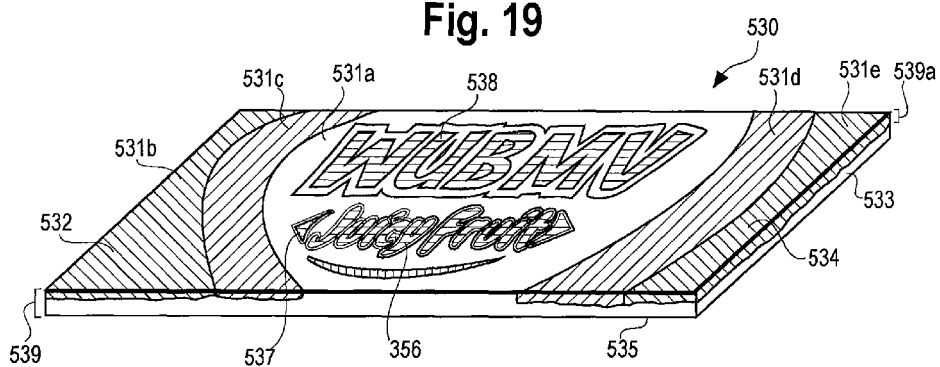
FIG. 19 is a perspective view of a confectionery product having an edible ink printed thereon of the present disclosure.

FIG. 19 illustrates a confectionery product 530 having an edible substrate 532 and an edible ink 536 printed thereon. The edible substrate 532 may comprise a body 533, a first surface 534 and a second surface 535, where the surfaces 534, 535 are located on opposite sides of the edible substrate 532. The edible ink 536 may be applied to one or both of the surfaces 534, 535. Moreover, the edible ink 536 may be applied to one or both surfaces 534, 535 so as to cover at least about 5% of either or both surfaces 534, 535, or from about 5% to about 100% of either or both surfaces 534, 535 or any value therebetween. In an embodiment, the edible ink 536 may cover from about 50% to about 100% of either or both surfaces 534, 535 or any value therebetween. In another embodiment, the edible ink 536 may cover from about 75% to about 100% of either or both surfaces 534, 535 or any value therebetween. In yet a further embodiment, the edible ink 536 may cover about 100%, or 100%, of either or both surfaces 534, 535.

The edible ink 536 may form an edible ink-indicia 538. Edible ink-indicia 538 may be any edible ink-indicia desired. The edible ink-indicia 518 may be any single color or multiple color edible ink or ink composition as discussed herein. Further, the edible ink-indicia 518 may also be directed toward certain events and/or advertising. The event may be any event as previously disclosed herein and may further include any occurrence, happening, activity, social activity, affair, celebration, ceremony, incident, that may be identifiable by a person or a consumer. The event may be an international activity (i.e., the Olympics or World Cup) or a nationally recognized event (i.e., presidential election) known or identifiable to a large number of people. Alternatively, the event may be known to only a small segment of society or a small number of people, club or private organization, such as a trade show or a family reunion, for example. Non-limiting examples of suitable events include a current event (such as a hostage being freed); a sports event; a holiday (St. Valentine's Day, the Fourth of July), a religious event, a political event such as a campaign, a speech, or a local, regional, state, or federal election; a judicial ruling (Martha jailed!); a seasonal event such as the Grammies or the Oscars; a cultural event such as a music performance, an art exhibit, a movie, or a television program; and combinations thereof.

Figure 20:
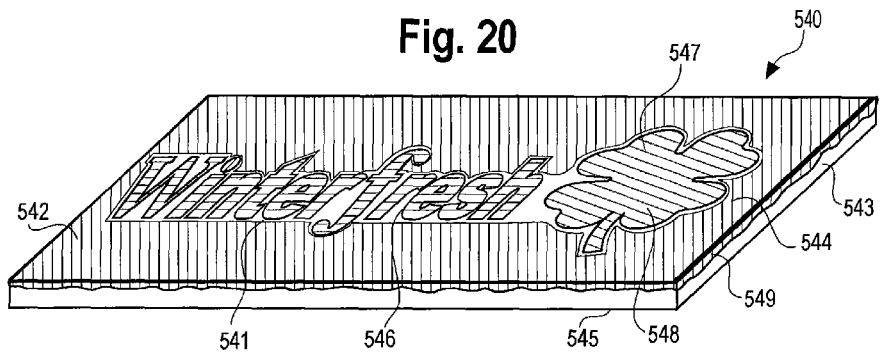
FIG. 20 is a perspective view of a confectionery product having an edible ink printed thereon of the present disclosure.

Moreover, the edible ink-indicia 518 may be any edible ink-indicia as disclosed herein. The edible ink-indicia 518 may be an inkjet-indicia. The edible ink-indicia may include any feature as disclosed herein. For example, the edible ink-indicia 548 may include a green shamrock 547 for marketing during St. Patrick's Day, as is shown in FIG. 20, and discussed herein below. The feature may include a portion of or all of the edible ink-indicia 518. In an embodiment, any organoleptic component as previously discussed herein may be dispensed on the edible substrate.

Further, each letter and/or word in the edible ink-indicia 518 may be considered an individual feature as the size, font, layout and design of each letter/word may be varied as desired. Each letter or word may be printed with single or multiple colors that may be the same or different than the color(s) used to print the other letters or words. For example, the letters "WUBMV" may be one color, while the letters may be outlined in another color, such as white. As shown in FIG. 19, the unprinted portion 531a of the first surface 534 of the substrate 532 may remain unprinted or may be another color such as, for example, yellow. Portions 531b, 531c, 531d, 531e may be other colors as desired to produce a multiple colored confectionery product. In an embodiment, confectionery product 530 may include four colors (such as yellow, red, blue, and black) in addition to uncolored portion 531a.

One having ordinary skill in the art will appreciate that the coloring, shading, texture, size, shape, etc., may vary depending on specific embodiments or market demand, for example. Further, the term "JUICY FRUIT" may be presented in a decorative font, color, layout and design that is different from earlier packaging designs. The ability of a manufacturer to vary the features of the edible ink-indicia may help to draw the consumer's attention to the product, thereby increasing consumer appeal in the product.

As is further illustrated in FIG. 19, in an embodiment, the edible ink 536 does not extend through the body 533 of the edible substrate 532, and therefore is not visible on the second surface 535 of the edible substrate 532. For example, the edible ink 536 may absorb a certain distance 539a into the edible substrate 532. However, the edible ink 536 does not absorb through the entire thickness 539 of the edible substrate 532. In other words, since the edible ink 536 does not extend completely through the body 533 of the edible substrate 532, one having ordinary skill in the art would recognize that the edible ink 536 would not be visible on the second surface 535 of the edible substrate 532 if the edible ink 536 were applied only to the first surface 534.

In an embodiment, the edible ink 536 may absorb a distance 539a that is about 1% to about 25%, or about 10%, or any value therebetween of the thickness 539 of the edible substrate 532. Similarly, the edible ink 536 may absorb a distance 539a that is about 5% to about 50% of the thickness 539 of the edible substrate 532. For example, typical sticks of chewing gum have thicknesses of about 0.068 inches for sugarless chewing gum sticks and about 0.072 inches for chewing gum sticks including a sugar component. Therefore, with a sugarless stick of chewing gum, the edible ink 536 may absorb a distance 539a that is about 0.00068 inches to about 0.017 inches, or about 0.0068 inches, or any value therebetween, or about 0.0034 inches to about 0.034 inches of the thickness 539 of the edible substrate 532. Similarly, with a chewing gum stick having a sugar component, the edible ink 536 may absorb a distance 539a that is about 0.00072 inches to about 0.018 inches, or about 0.0072 inches, or any value therebetween, or about 0.0036 inches to about 0.036 inches of the thickness 539 of the edible substrate 532. As a further example, typical chewing gum tabs have thicknesses of about 0.141 inches and typical chewing gum pellets have thicknesses of about 0.156 inches. Therefore, with a chewing gum tab, the edible ink 536 may absorb a distance 539a that is about 0.00141 inches to about 0.03525 inches, or about 0.0141 inches, or any value therebetween, or about 0.00705 inches to about 0.0705 inches of the thickness 539 of the edible substrate 532. Similarly, with a chewing gum pellet, the edible ink 536 may absorb a distance 539a that is about 0.00156 inches to about 0.039 inches, or about 0.0156 inches, or any value therebetween, or about 0.0078 inches to about 0.078 inches of the thickness 539 of the edible substrate 532.

In an embodiment, and in order to prevent edible ink 536 from extending through body 533 of the edible substrate 532 and being visible on the second surface 535 of the edible substrate 532 (that is, to prevent the edible ink 536 from being visible on surface 535), the edible ink 536 may be printed on the edible substrate 532 at a dot resolution of less than about 100 dots per inch, as will be discussed herein.

In an embodiment, the confectionery product 530 shown in FIG. 19 includes an edible ink-indicia 538 including the letters "WUBMV," an acronym for the phrase "Will You Be My Valentine." Because the product 530 is associated with St. Valentine's Day, the product 530 may be marketed prior to St. Valentine's Day to increase consumer appeal associated with the product 530. The edible ink-indicia 538 may further include an advertisement such as the term "JUICY FRUIT" text in decorative font with the double-headed fanciful arrow symbol 37 associated therewith. One of ordinary skill in the art will appreciate the myriad of possibilities by which the ink-indicia printed upon the confectionery product may be associated with an event (such as a holiday).

FIG. 20 also shows a confectionary product 540 similar to the confectionary product 530 in FIG. 19 but having an edible ink-indicia 548. The edible ink-indicia 548 of FIG. 20 is directed toward St. Patrick's Day as is evidenced by the indicia 547 of a shamrock. The product 40 also includes an advertisement for a specific brand of chewing gum, Winterfresh, as is shown by the edible ink 546. In an embodiment, the edible ink 546 may cover from about 80% to about 95% of the edible substrate 542. Further, the lettering of the word Winterfresh may be one color, the shamrock 547 may be another color, and the remaining portion of the edible substrate 542 outside of the letter tracing 541 may be another color. One of ordinary skill in the art will recognize that colors, lettering, textures, etc. may change depending on specific embodiments or market demand. Further, the edible ink-indicia 548 may include a feature and/or an organoleptic component as previously described herein. For example, the shamrock 547 may have green coloring and may have an added breath freshening agent or mint flavor deposited thereon.

Figure 21:
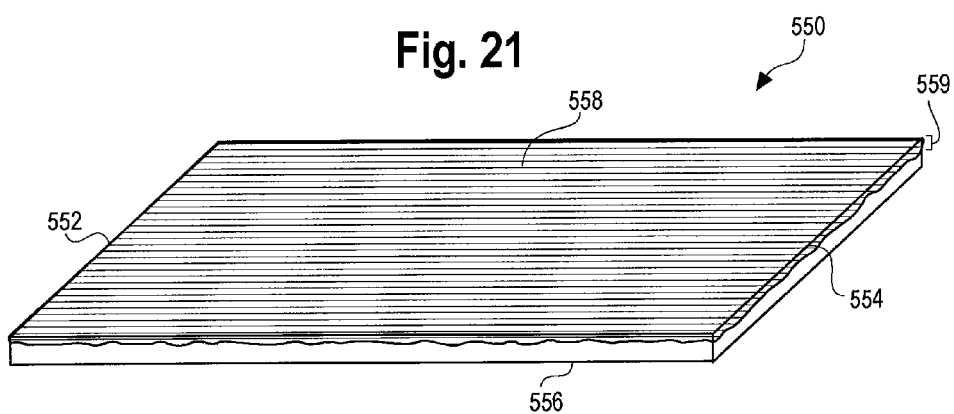
FIG. 21 is a perspective view of a confectionery product printed with an edible ink of the present disclosure.

FIG. 21 illustrates a stick of chewing gum 550 having a co-extruded or multi-layered appearance. In an embodiment, the chewing gum 550 includes an edible substrate 552, a first surface 554 and a second surface 556. When an edible ink 558 is applied to about 100%, or 100%, of the first surface 552 of the chewing gum 550, the edible ink 550 may be allowed to absorb partially into the edible substrate as shown by the absorbed distance 559. Therefore, a side view or cross-sectional view of the chewing gum 550 reveals the color of the edible ink 558 that has absorbed partially through the edible substrate 552 and gives the chewing gum 550 the appearance of having two layers and the appearance of a co-extruded product. For example, if the edible ink 558 is colored blue and the edible substrate 552 is colored white, the chewing gum 550 will appear to have been co-extruded from a batch of chewing gum colored blue and a batch of chewing gum colored white.

Figure 22:
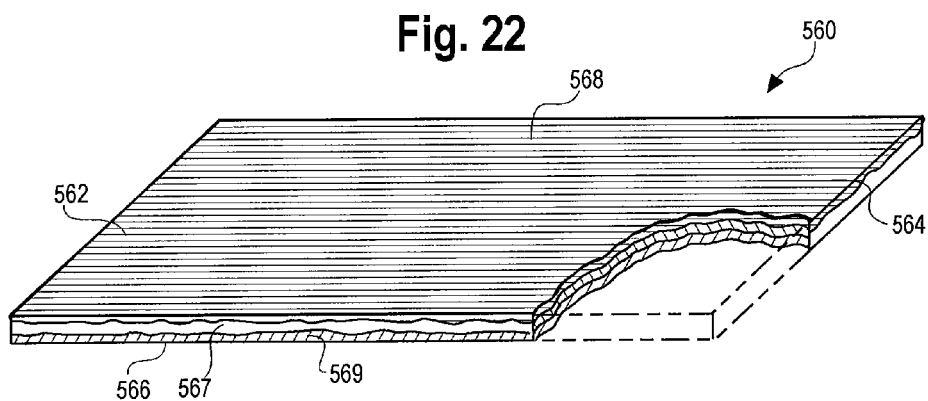
FIG. 22 is perspective view of a confectionery product printed with an edible ink of the present disclosure.

Similarly, FIG. 22 illustrates a stick of chewing gum 560 having a co-extruded or multi-layered appearance. In an embodiment, the chewing gum 560 has an edible substrate 562, a first surface 564, and a second surface 566. In this embodiment, however, an edible ink 568 is applied to the entirety of both the first surface 564 and the second surface 566 of the chewing gum 560. That is, about 100%, or 100%, of surfaces 564 and 566 are covered with the edible ink 568. Accordingly, the edible ink 568 may absorb partially into the edible substrate 562 from both surfaces 564, 566 as shown by the numbers 567 and 569, respectively. In this embodiment, therefore, the edible substrate 562 of the chewing gum 560 appears to consist of three separate layers, as is clearly illustrated by the cut-away section of FIG. 22. For example, if an edible ink 568 colored blue is printed onto the first surface 564 of the edible substrate 562, an edible ink 568 colored red is printed onto the second surface 566 of the edible substrate 562, and the edible substrate 562 is white, the chewing gum 560 will appear to have been co-extruded from a batch of chewing gum colored blue, a batch of chewing gum colored red, and a batch of chewing gum colored white. Moreover, a chewing gum 560 printed with the colors red, white and blue may be marketed prior to July Fourth to increase consumer appeal for the chewing gum 560. Alternatively, a chewing gum printed with the colors red, white and blue may also have organoleptic components associated with the colors. For example, if an edible ink 568 colored blue is printed onto the first surface 564 of the edible substrate 562, and an edible ink 568 colored red is printed onto the second surface 566 of the edible substrate 562, the first surface 564 may have a blueberry flavor associated therewith and the second surface 566 may have a strawberry flavor associated therewith.

In an embodiment, a trim material may be incorporated into the edible substrate. In an embodiment, the edible substrate may contain from about 1% to about 50% by weight trim material or any value therebetween. In a further embodiment, the edible substrate may contain from about 10% to about 20% by trim material. The trim material may be used in conjunction with the edible ink to provide an aesthetically pleasing chewing gum. As used herein, "trim material" is confectionery material that has been used in a previous confectionery product manufacturing process. Trim material may include rework confectionery, scrap confectionery, or a blend of two or more virgin or starting confectionery materials that have come into contact with each other during a previous confectionery production process. In other words, trim material may have been a starting material in a previous confectionery manufacturing process. Trim material is often difficult to recycle or incorporate into a finished confectionery product as the organoleptic characteristics of the trim material may be unpredictable and difficult to control. Consequently, the appearance, taste, smell, color, texture, and mouthfeel of trim material may be unpredictable. This unpredictability of trim material typically results in trim material being discarded. This results in waste and a decrease in product yield. In this situation, edible ink may be used to cover or mask the inconsistencies in the color or texture of the trim material when it is incorporated into a new gum base batch to be re-rolled, scored, packaged and sold. For example, the edible substrates 552 and 562 of FIGS. 21 and 22 may include trim material that has been printed on with edible ink. Thus, the edible ink 558 may mask or cover any inconsistencies in the edible substrate 552 (FIG. 21). Similarly, the edible ink 568 may cover or hide any inconsistencies in the edible substrate 562 (FIG. 22). This process may not only provide the consumer with an appealing chewing gum product having a co-extruded or multi-layered look, but may also improve and increase production economies by allowing reuse of the chewing gum trim to create a final chewing gum product.

Figure 23:
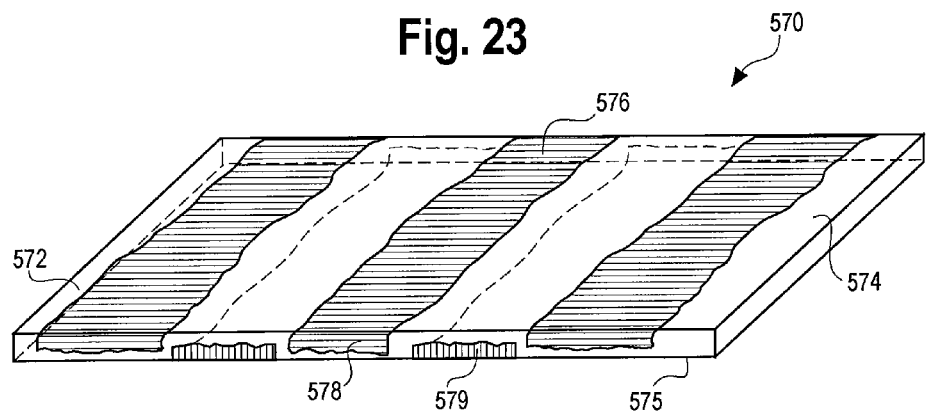
FIG. 23 is perspective view of a confectionery product printed with an edible ink of the present disclosure.

As a further example, FIG. 23 shows a stick of chewing gum 570 having a co-extruded or multi-layered appearance. In an embodiment, the chewing gum 570 may have an edible substrate 572, a first surface 574 and a second surface 575. In this embodiment, however, an edible ink 576 may be applied to either surface 574, 575 or both the first surface 574 and the second surface 575 of the edible substrate 572 in a random, wavy pattern. The non-shaded areas 577 represent areas of the edible substrate 572 that were not printed with edible ink 576. However, in the shaded areas that were printed with the edible ink 576, the edible ink 576 may be allowed to absorb partially into the edible substrate 572 from both surfaces 574, 575 as is shown by the numbers 578 and 579, respectively. FIG. 23 illustrates that the edible ink 578 may be applied to the edible substrate 572 continuously or intermittently as a printing device traverses the edible substrate 572. One having ordinary skill in the art would recognize that patterns, colors, etc., of the edible ink 576 printed onto the edible substrate 572 are limited only by one's imagination.

As illustrated, variations on embodiments discussed in the present disclosure are essentially limitless. One having ordinary skill in the art will recognize that features, patterns, colors, shading, texturing, shape, font, layout, design and other characteristics that may be associated with a printed confectionery product may change depending on influences such as personal preferences or market demand. For example, a consumer may be able to utilize the Internet to create his or her own personal design on a confectionery product such as chewing gum yielding a customized product. The consumer may log on to a website maintained by a chewing gum manufacturer and enter the exact words, phrase, coloring, shading, textures, etc., that the consumer wishes to have printed on a confectionery product. The consumer may also provide or send to the chewing gum manufacturer an image, such as a photograph, which the chewing gum manufacturer may non-contact print on a chewing gum. The consumer may also choose one or more organoleptic components to be dispensed on the chewing gum. For example, a consumer may choose the phrase "Happy Birthday, Hunter!" to be printed in red edible ink on a stick of chewing gum with a birthday cake having candles printed beside the font. The chewing gum manufacturer may subsequently print the phrase on one or more pieces of chewing gum and/or packages, package the printed chewing gum based on the consumer's desires, and deliver the customized gum product to the consumer.

In an embodiment, a method for producing an chewing product is provided. The method includes providing a consumer with the ability to select an organoleptic component, and producing a chewing gum product with the organoleptic component after the consumer selection. The chewing gum product having the selected organoleptic component is then delivered to the consumer.

In an embodiment, the method includes providing an Internet site with a list of the organoleptic components. The Internet site is supported by or otherwise hosted by a Web site server as is commonly known in the art. The consumer may visit the Internet site and select one or more desired organoleptic components from the list of organoleptic components displayed on the site. The selected organoleptic component(s) may then be added to the final chewing gum product. The selection by the consumer is then sent to a production facility whereby the selected organoleptic components are added to a chewing gum substrate. The chewing gum substrate may be any chewing gum material as previously discussed herein.

In an embodiment, a processor generates the list of organoleptic components in a computer-readable medium. The processor may be any data processing device capable of generating the list of organoleptic components as is commonly known in the art. Nonlimiting examples of suitable processors include a computer, a personal computer, a server (such as an Internet server or a Web server), a personal data assistant (i.e., a Blackberry device), and combinations thereof. The processor may include a graphical display, a keyboard, and/or a mouse as is commonly known in the art. The processor may display one or more of any of the aforementioned organoleptic components disclosed herein in the list. Once the consumer selects the desired organoleptic components, the processor receives this selection data and generates instruction data resulting from the consumer input. By way of an interface, the processor transmits the instruction data to a dispensing device. The dispensing device is adapted to receive the instruction data and dispenses the selected organoleptic component(s) onto a surface of a chewing gum substrate to produce the chewing gum product. The chewing gum product may be wrapped and/or packaged as is commonly known in the art.

The interface may a computer interface, an Internet connection, a cable connection, a wireless connection, a wireless application interface, and combinations thereof.

In an embodiment, the method may include providing the consumer with the ability to select and/or design the wrapper for the chewing gum product. The method may also include permitting the consumer to select the color of the chewing gum product.

In an embodiment, the method may include providing the consumer the ability select to an indicia and producing the chewing gum with the indicia. The indicia may be any of the previously described ink-indicia. In a further embodiment, the consumer may generate, produce, or otherwise create the indicia.

For example, the consumer may visit the Internet site as discussed above. The consumer may then upload an indicia (such as an image or a photograph in electronic form) to be printed on the chewing gum product. The processor may receive this indicia data and generate indicia printing instructions. The indicia printing instructions may be transmitted by way of the interface to a printing device. The printing device is adapted to receive the indicia printing instructions and prints the indicia on a surface of the chewing gum substrate. The indicia is printed with edible ink which may be a single color or may be multi-colored. The consumer-selected/generated indicia may also be printed on a wrapper or on packaging for the chewing gum product.

In an embodiment, the printing device is a non-contact printing device. In a further embodiment, the printing device is an ink-jet printing device. Thus, production of the chewing gum product may include dispensing (with a dispensing device) the selected organoleptic component(s) onto a surface of the chewing gum substrate. The production may further include printing (with a printing device) the consumer-provided indicia onto a surface of the chewing gum substrate. In an embodiment, the organoleptic component may be a component of an edible ink as previously discussed. Consequently, the organoleptic component and the indicia may be applied to the chewing gum substrate surface simultaneously, or substantially simultaneously, with a single printing device. The production of the chewing gum product may also include wrapping and/or packaging the chewing gum product.

In an embodiment, the production step of the method may occur at a chewing gum production facility or a post-production facility. For example, the method may utilize apparatus 10 as previously discussed herein. Alternatively, the production may occur at a post-production facility which includes a supply of chewing gum substrate, a dispensing device for the organoleptic component, and/or a printing device. The post-production site may also include a packaging device.

In an embodiment, the chewing gum product may be delivered to the consumer or to an intermediate party such as a distributor, a wholesaler, or to a retail outlet. The method may include mailing the chewing gum product to the consumer, or mailing the chewing gum product to any of the aforementioned intermediate parties. Delivery may also include preparing the chewing gum product for pick-up by the consumer from the production facility, the post-production facility, or from any of the aforementioned intermediate parties.

In an embodiment, a method of generating revenue is provided. The method includes allowing a consumer to create a custom chewing gum by selecting an organoleptic component, and producing a chewing gum product with the selected organoleptic component. The method may include the consumer paying a fee for the custom production of the chewing gum product. The fee may be based on the number organoleptic components, the amount of chewing gum product desired by the consumer, and combinations thereof. The method of generating revenue may further include allowing the consumer to select an indicia and producing the chewing gum product with the indicia. Production of the custom chewing gum product may be accomplished as discussed above. The method provides a wide array of customization opportunities for the consumer to create an individualized chewing gum product. Thus, the fee may be based on any number of customized features selected by the consumer.

In an embodiment, a printed confectionery product is provided, the confectionery product having edible ink printed on an edible substrate where the edible ink does not run-off the edible substrate. In other words, the edible ink does not "pool" or collect on top of the edible substrate, and does not bleed-through the edible substrate. As used herein, "pooling" is the accumulation of excess ink on the substrate surface. "Pooling" may also occur when the edible ink is applied in a manner that is too concentrated, collects on top of the edible substrate and remains moist after application. "Pooling" is problematic because moist or wet ink on a top surface of a first edible substrate may be transferred to the bottom surface of another edible substrate when multiple batches of edible substrates are stacked for further processing and/or packaging.

Edible ink bleed-through occurs when an edible substrate is thin or porous or when an edible ink concentration is high and the edible ink soaks entirely through the edible substrate and therefore is visible on an opposing surface of the edible substrate. For example, while most inkjet printers are capable of a printing resolution of about 360 dots per inch, use of such a high resolution may cause the edible ink to bleed-through the edible substrate. When manufacturing a confectionery product, unintentional bleed-through is undesirable. If an edible ink absorbs entirely through a stick of chewing gum during processing, the edible ink may cause damage to or mar machinery, stain the structure underlying the chewing gum, damage or mar subsequent batches of chewing gum sticks placed on a stained structure, contaminate underlying chewing gum layers if the gum is stacked after printing, or even mar packaging at the end of the manufacturing process. Consequently, undesirable bleed-through can be a very time-consuming and highly costly problem.

To prevent a bleed-through of the edible ink through the edible substrate during or after the edible ink is printed onto the edible substrate, a printing resolution of not more than 100 dots per inch may be used. A printing resolution of not more than or about 100 dots per inch may ensure proper coverage of the edible substrate by the edible ink to give the substrate a co-extruded or multi-layered appearance, while at the same time ensuring that the edible ink printed onto the edible substrate does not absorb entirely through the edible substrate to an opposing surface. In other words, application of the edible ink at about 100 dots per inch may help to ensure that the edible ink is absorbed only on the applied surface of the edible substrate. Using a similar dot resolution also allows the surface of the edible substrate to be coated by up to 100% of the surface area. One of ordinary skill in the art will appreciate that the edible ink concentration on the edible substrate surface may vary based on the composition of the edible substrate. Thus, the print resolution may vary from about 60 dots per inch to about 400 dots per inch, or any value therebetween, or may be about 100 dots per inch, while simultaneously preventing bleed-through.

In yet another embodiment, methods of producing a confectionery product are provided. For example, in an embodiment, a method of producing a confectionery product comprises the steps of providing an edible substrate; providing a non-contact printing device having at least one printing head for printing edible ink; and printing the edible ink onto a surface of the edible substrate at a dot resolution of less than about one hundred dots per inch, as discussed above. In an embodiment, the edible ink is applied to the surface of the edible substrate so as to cover at least about 5% of the surface of the edible substrate. In another embodiment, the edible ink covers at least about 50% of the surface of the edible substrate. In yet another embodiment, the edible ink covers at least about 75% of the surface of the edible substrate. In yet a further embodiment, the edible ink may cover about 100%, or 100%, of either both surfaces.

In an additional embodiment, a method of producing a confectionery product comprises the steps of providing an edible substrate having a first and a second surface, providing a non-contact printing device having at least one printing head for printing edible ink, and printing the edible ink onto one or both surfaces. Moreover, the edible ink may be applied to one or both surfaces so as to cover at least about 5% of either or both surfaces, or from about 5% to about 100% of either or both surfaces, or any value therebetween. In another embodiment, the edible ink may cover about 50% to about 100% of either or both surfaces, or any value therebetween. In yet another embodiment, the edible ink may cover about 75% to about 100% of either or both surfaces, or any value therebetween. In yet a further embodiment, the edible ink may cover about 100%, or 100%, of either both surfaces.

Methods of producing a confectionery product may further include allowing the edible ink to absorb partially through a body of the edible substrate to provide the edible substrate with a co-extruded appearance. With co-extruded products, two or more materials are extruded through a single die with two or more orifices arranged so that the extrudates merge together into a laminar structure before cooling. With chewing gum, for example, an extruded center portion having one color may be layered with or surrounded by an extruded outer layer or shell having a second color. A cross-sectional view of such a chewing gum product would reveal more than one color, thereby giving the gum a multi-layered or co-extruded appearance. Similarly, a cross-sectional view of the body of an edible substrate after allowing an edible ink to absorb partially through the body may reveal the color of the edible substrate on one surface of the body with the color of the edible ink on the other surface of the body that has also absorbed partially through the body. For example, the edible substrate (which may include trim material) may be light red or pink in color and a dark red edible ink may be applied to about 100%, or 100%, of one or both surfaces of the edible substrate. A cross-sectional view of this product would show a dark red exterior layer of red ink absorbed into the edible substrate and a light red layer where the edible substrate is absent of absorbed red ink. This controlled absorption of color may provide the edible substrate with a co-extruded or multi-layered look, thereby increasing consumer appeal for that product.

Figure 24:
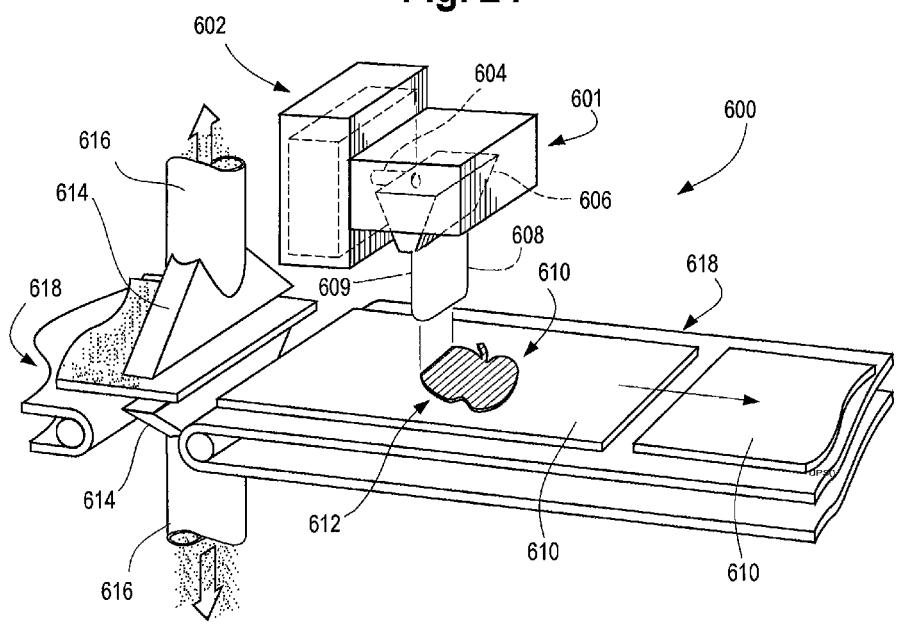
FIG. 24 is a perspective view of an apparatus for printing an edible ink on a confectionery product of the present disclosure.

Referring to FIG. 24, an apparatus 600 for non-stick printing ink-indicia on a confectionery product is provided. The apparatus includes a removal device 614 for removing at least a portion of the rolling compound 615 from the confectionery material 610. The removal device may be any device the removes some or all of the rolling compound 615 from the confectionery material 610. Non-limiting examples of removal devices include a vacuum system, a brush device, a sponge device, and combinations thereof. A further example of a removal device includes a washing device, a bath apparatus, and/or a rinse system that removes substantially all, or all, of the rolling compound from the confectionery material. Thus, the removing device may be a device capable of removing about 100%, or 100%, of the rolling compound 615 placed on the confectionery material 610.

Figure 25:
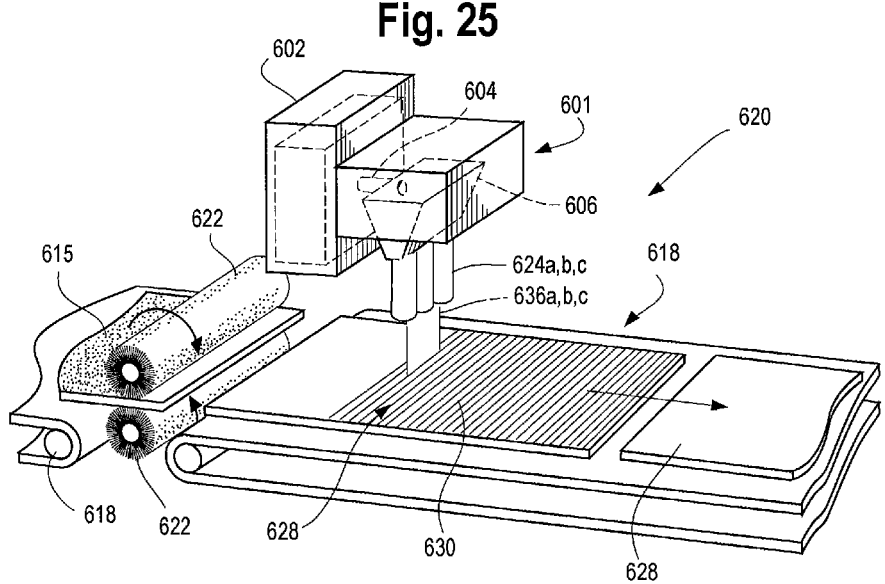
FIG. 25 is a perspective view of an apparatus for printing an edible ink on a confectionery product of the present disclosure.

In an embodiment, removal devices may be positioned above and/or below the confectionery material. Further, groups of removal devices may also be used in series or parallel configurations. FIGS. 24 and 25, for example, show parallel configurations of removal devices such that at least one pair of removal devices are positioned at the same point along a conveyor 618. When in parallel, the removal devices may remove rolling compound from the same portion of the confectionery material at the same time. Therefore, a confectionery material will traverse the parallel removal devices at the same time.

By contrast, FIG. 27 shows an example of a series configuration for removal devices. Here, at least two removal devices are positioned next to each other, together parallel to the direction the confectionery material moves. When in series, the removal devices do not remove rolling compound from the same portion of the confectionery material at the same time. Instead, a confectionery material that first traverses a first removal device will next traverse a second removal device.

In FIG. 24, the removal device 614 is a vacuum system. The vacuum system, using suction, draws rolling compound 615 away from the confectionery material 610. In the embodiment illustrated, two vacuum systems 614 are positioned, in parallel, above and below the confectionery material 610 so as to remove rolling compound from the top and bottom portions of the confectionery material 610. Therefore, if one desires to print edible-ink-indicia on the top and/or the bottom portion of the confectionery material, one can do so. Alternatively, a single removal device or a group of devices can all be positioned above or below the confectionery material 610, as will be discussed later in reference to FIG. 26. In an embodiment, the removal device may remove from about 50% to about 100% (or any value therebetween) or from about 80% to about 99% (or any value therebetween) of the rolling compound 615 from the confectionery material 610.

The apparatus also includes a printing device 601 for non-contact printing an edible ink-indicia 612 on the confectionery material 610. The printing device 601 may be any printing device as previously discussed herein. In an embodiment, the printing device 601 may be a non-contact printing device. In a further embodiment, the printing device may be an inkjet printing device. In the embodiment illustrated in FIG. 24, the printing device 601 includes an ink reservoir 602 and a print jet 606 with a channel 604 operatively connecting the reservoir and jet. The print jet 606 includes a single nozzle 608, depositing a single stream of edible ink 609 onto the confectionery material 610 to produce the edible ink-indicia 612. The edible ink-indicia 612 may, for example, cover about 5% of the confectionery product, as illustrated in FIG. 24.

The apparatus of FIG. 24 further includes a conveyor 618 that serves as a transport device for moving the confectionery material 610 under the printing device 601. The conveyor 618 in this embodiment is separated into smaller conveyors to allow the vacuum systems 614 access to the top and bottom portions of the confectionery material 610. Alternatively, if a single removal device or group of devices are all positioned above or below the confectionery material 610, a single long conveyor 641 with no separation may be used, as is illustrated in FIG. 26.

In an embodiment, printing device 601 may include more than one ink reservoir 602, channel 604 and print jet 606. Moreover, a single reservoir 602 may be in operative communication with multiple print jets 606 and multiple ink reservoirs 602 may be in operative communication with a single print jet 606. Further, it should be understood that a single print jet may include one or more nozzles that print ink onto the confectionery material. Each of these nozzles, which originate with a single print jet, may print, for example, in unison, at different times, with different ink concentrations, with different colors, with different designs, and combinations thereof.

In another embodiment, illustrated on FIG. 25, an apparatus 620 is provided that includes a pair of brush devices 622 positioned above and below the confectionery material 628 at a separation in the conveyor 618. These brush devices 622, similar to the vacuum systems 614 of FIG. 24 are positioned so as to remove rolling compound 615 from the confectionery material. The embodiment in FIG. 25 also provides a single print jet with multiple nozzles 624a, 624b and 624c. Each nozzle deposits a respective edible ink stream 626a, 626b and 626c. The use of multiple nozzles for a single print jet allows, for example, increased flexibility in the indicia printed. For example, if the nozzles do not print in unison, the indicia can have alternating sections of non-printed confectionery material between printed indicia. The edible ink-indicia 630 of FIG. 25 illustrates an example of such flexibility. The edible ink-indicia 630 of FIG. 25 also provides an example of ink indicia covering about 50% of the confectionery product.

In another embodiment, illustrated on FIG. 26, an apparatus 632 is provided that includes a first detection device 634 positioned upstream of the printing device 601 and a second detection device 638 positioned downstream of the printing device 601. The first detection device 634 may be, for example, a photoeye that detects the confectionery material 610 when the confectionery material is in a predetermined position. The detection device 634 may be in operative communication with the printing device 601 such that the printing device 601 non-contact prints an edible ink-indicia 612 on the confectionery material when the detection device 634 detects the confectionery material in a predetermined position. For example, the apparatus may have a controller that initiates the printing device when confectionery material is in the predetermined position. At that point, the printing device can, for example, print edible ink indicia at the predetermined position and/or continue to print the edible ink indicia as the confectionery material traverses the printing device. When continuing to print, the printed edible ink indicia may cover about 75% of the confectionery product as illustrated, for example, on FIG. 26.

The second detection device 638 may also be, for example, a photoeye that detects defective confectionery material after the confectionery has been printed upon. The detection device 638 may also be in operative communication with the printing device 601 such that the printing device 601 will turn off when the second detection device 638 detects defective confectionery material. Such operative communication, similar to the first detection device 634, may be accomplished with a controller that turns off the printing device 601 when detection device 638 detects defective product and sends the appropriate signal to the controller.

The detection device may be any detection device as is commonly known in the art. Also, any manner of detection known by one skilled in the art may be used in the present disclosure. Nonlimiting examples of suitable detection devices include, for example, infrared sensors, camera/photo monitoring, luminescence sensors, light array sensors, color sensors, mark sensors, profiling sensors and combinations thereof. Further, at least one detection device may be used. Therefore, if positioned correctly, a single detection device may be used for both operation of the printing device and for detection of defective confectionery material. For example, if a small indicia is printed on the confectionery material, a single detection device located slightly downstream from the printing device can both detect defective confectionery material and also detect confectionery material in a predetermined position for non-contact printing.

In another embodiment, illustrated on FIG. 27, an apparatus 642 is provided that includes multiple removal devices, a vacuum system 648 and a brush device 652, operating in series to remove rolling compound 615 from confectionery material 644. In this embodiment, vacuum system 648 performs two functions. First, vacuum system 648 draws removed rolling compound away from the confectionery material 644. Second, vacuum system 648 draws away rolling compound removed by the brush device 652 such that the rolling compound drawn 650 removed includes rolling compound removed from both the vacuum system and the brush device. FIG. 27 also illustrates edible ink indicia 646 that covers about 100%, or 100%, of the confectionery product. FIG. 21 also provides another example of similar coverage by edible ink indicia.

Alternatively, multiple removal devices can be used in series while being kept apart from each other. For example, a series configuration of a brush device and vacuum system can be used such that the brush device accomplishes a portion of the required removal percentage and the vacuum system accomplishes the remaining portion of the required removal percentage. For instance, if required to remove about 80% of the rolling compound, the brush device can remove about 40% and the vacuum system can remove about 40%. This configuration may be beneficial because it may allow the vacuum system to operate at a lower power level. By operating at a lower power level, there is a decreased risk that suction from the vacuum system can, for example, lift the confectionery material off the conveyor, stretch the confectionery material or crack the confectionery material.

FIG. 27 also illustrates edible ink indicia 646 that covers about 100%, or 100%, of the confectionery product. FIG. 21 also provides another example of similar coverage by edible ink indicia.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A confectionery product comprising:
   a chewing gum having a surface defining an indentation; and
   an edible ink forming a 3-D object printed through non-contact printing on the chewing gum, wherein the 3-D object is disposed in connection with the indentation on the surface of the chewing gum and comprises multiple layers, and wherein the edible ink comprises an ink selected from the group consisting of water-based ink, solvent-based ink, wax-based ink, absorbing ink, pigment-containing ink, non-pigment containing ink, and combinations thereof.

2. The confectionery product of claim 1, wherein the chewing gum is selected from the group consisting of a chewing gum stick, a chewing gum tablet, a chewing gum pellet, a coated chewing gum, a center-filled chewing gum and combinations thereof.

3. The confectionery product of claim 1, wherein the edible ink comprises polyols, solvents, dies, lakes, pigments, or combinations thereof.

4. The confectionery product of claim 1, wherein the edible ink comprises a solvent selected from the group consisting of oil, fat, wax, water, glycerol, polypropylene glycol, propylene glycol, glycerin, and combinations thereof.

5. A confectionary product comprising:
   an edible substrate having a surface defining a feature; and
   a 3-D object formed by a flowable edible material disposed in connection with the feature on the edible substrate, wherein the 3-D object comprises multiple layers, wherein the feature defines a surface embossment and the flowable edible material includes a polyol, and is an edible ink, and wherein the edible ink comprises ink selected from the group consisting of water-based ink, solvent-based ink, wax-based ink, absorbing ink, pigment-containing ink, non-pigment containing ink, and combinations thereof.

6. The confectionary product of claim 5 wherein the edible substrate is a chewing gum selected from the group consisting of a chewing gum stick, a chewing gum tablet, a chewing gum pellet, a coated chewing gum, a center-filled chewing gum and combinations thereof.

7. The confectionary product of claim 5 wherein the edible ink comprises polyols, solvents, dyes, lakes, pigments, or combinations thereof.

8. The confectionary product of claim 5 wherein the surface embossment is an indentation, a protrusion, or combinations thereof.

9. The confectionary product of claim 5 wherein the surface embossment is an indentation.

10. The confectionary product of claim 9 wherein the 3-D object formed by the edible flowable material is disposed within the indentation on the surface of the substrate.

11. The confectionary product of claim 7 wherein the edible ink comprises a solvent selected from the group consisting of oil, fat, wax, water, glycerol, polypropylene glycol, propylene glycol, glycerin, and combinations thereof.

12. The confectionary product of claim 7 wherein the edible ink includes an organoleptic component that includes an agent selected from the group consisting of a cooling agent, a heating agent, a breath freshening agent, an audible agent, and combinations thereof.

13. The confectionary product of claim 12 wherein the edible ink further includes a second organoleptic component.

14. The confectionary product of claim 13 wherein the second organoleptic component further includes an agent selected from the group consisting of a cooling agent, a heating agent, a breath freshening agent, an audible agent, and combinations thereof.

* * * * *